US010853748B2

(12) United States Patent
Ha et al.

(10) Patent No.: US 10,853,748 B2
(45) Date of Patent: Dec. 1, 2020

(54) MANAGING MATERIAL HANDLING PRODUCTIVITY

(71) Applicant: Caterpillar Inc., Deerfield, IL (US)

(72) Inventors: Chris Ha, Champaign, IL (US); Chau Le, Urbana, IL (US)

(73) Assignee: Caterpillar Inc., Peoria, IL (US)

( * ) Notice: Subject to any disclaimer, the term of this patent is extended or adjusted under 35 U.S.C. 154(b) by 246 days.

(21) Appl. No.: 16/000,054

(22) Filed: Jun. 5, 2018

(65) Prior Publication Data

US 2019/0370725 A1 Dec. 5, 2019

(51) Int. Cl.
*G06Q 10/06* (2012.01)
*G06Q 50/30* (2012.01)

(52) U.S. Cl.
CPC ........ *G06Q 10/063114* (2013.01); *G06Q 10/06313* (2013.01); *G06Q 10/06314* (2013.01); *G06Q 50/30* (2013.01)

(58) Field of Classification Search
CPC ..... G06Q 10/063114; G06Q 10/06313; G06Q 10/06314; G06Q 50/30
See application file for complete search history.

(56) References Cited

U.S. PATENT DOCUMENTS

| 7,493,211 | B2 | 2/2009 | Breen |
| 8,983,497 | B2 | 3/2015 | Ziskind et al. |
| 9,226,105 | B2 | 12/2015 | Turgman et al. |
| 9,408,031 | B1 | 8/2016 | Steger et al. |
| 9,424,545 | B1* | 8/2016 | Lee ............... G06Q 10/06311 |
| 9,456,302 | B2 | 9/2016 | Skomra et al. |
| 9,811,949 | B2 | 11/2017 | Baliew et al. |
| 9,822,509 | B1 | 11/2017 | Chi |
| 9,867,000 | B2 | 1/2018 | Zises |
| 2006/0270421 | A1* | 11/2006 | Phillips ............. G08B 21/0261 |
| | | | 455/457 |
| 2008/0011839 | A1* | 1/2008 | Noll .................. G06Q 10/08 |
| | | | 235/384 |
| 2009/0024442 | A1* | 1/2009 | Brink ............. G06Q 10/06315 |
| | | | 705/7.16 |
| 2009/0096637 | A1* | 4/2009 | Olson ..................... E02F 9/26 |
| | | | 340/993 |
| 2010/0042940 | A1 | 2/2010 | Monday et al. |

(Continued)

FOREIGN PATENT DOCUMENTS

WO 9530880 W 11/1995

*Primary Examiner* — Sujay Koneru
(74) *Attorney, Agent, or Firm* — Harrity & Harrity LLP

(57) ABSTRACT

A device for managing material handling productivity is disclosed. The device may receive information identifying a moving zone for a job site, a quantity of loads for the moving zone, and a material for the moving zone, and may identify a first machine, from multiple machines, to assign to the moving zone, the quantity of loads, and the material. The device may provide, to a first user device associated with the first machine, information indicating that the moving zone, the quantity of loads, and the material are assigned to the first machine. The device may receive, from the first user device, location information associated with the first user device and the first machine, and may provide the location information to a second user device, associated with a second machine, to enable the second machine to travel to the first machine.

20 Claims, 15 Drawing Sheets

(56) References Cited

U.S. PATENT DOCUMENTS

| | | | |
|---|---|---|---|
| 2010/0094548 A1* | 4/2010 | Tadman | G06Q 50/16 |
| | | | 701/533 |
| 2010/0138266 A1* | 6/2010 | Nichols | G06Q 10/06313 |
| | | | 705/7.23 |
| 2010/0312599 A1 | 12/2010 | Durst | |
| 2012/0008526 A1* | 1/2012 | Borghei | H04W 4/022 |
| | | | 370/254 |
| 2012/0034929 A1* | 2/2012 | Ozer | G01S 19/13 |
| | | | 455/456.1 |
| 2012/0215378 A1 | 8/2012 | Sprock | |
| 2013/0035978 A1* | 2/2013 | Richardson | G06Q 10/087 |
| | | | 705/7.27 |
| 2013/0046418 A1 | 2/2013 | Anderson | |
| 2014/0039839 A1* | 2/2014 | Yuen | A61B 5/6802 |
| | | | 702/189 |
| 2014/0244098 A1* | 8/2014 | Ueda | G06Q 50/02 |
| | | | 701/29.3 |
| 2015/0210213 A1* | 7/2015 | Mitsuta | E02F 9/264 |
| | | | 340/435 |
| 2016/0034730 A1* | 2/2016 | Delplace | G06K 7/10366 |
| | | | 340/8.1 |
| 2016/0042303 A1* | 2/2016 | Medina | H04W 4/024 |
| | | | 705/5 |
| 2016/0048795 A1 | 2/2016 | Walton | |
| 2016/0100002 A1* | 4/2016 | Dimonte | H04L 51/24 |
| | | | 709/203 |
| 2016/0231750 A1* | 8/2016 | Kawamata | G06Q 50/02 |
| 2017/0132547 A1 | 5/2017 | Myers | |
| 2017/0344011 A1 | 11/2017 | Stratton | |
| 2018/0218304 A1* | 8/2018 | Shike | G06Q 50/08 |
| 2018/0251346 A1* | 9/2018 | Thomson | B66C 13/06 |
| 2019/0370726 A1* | 12/2019 | Ha | G06Q 50/08 |

\* cited by examiner

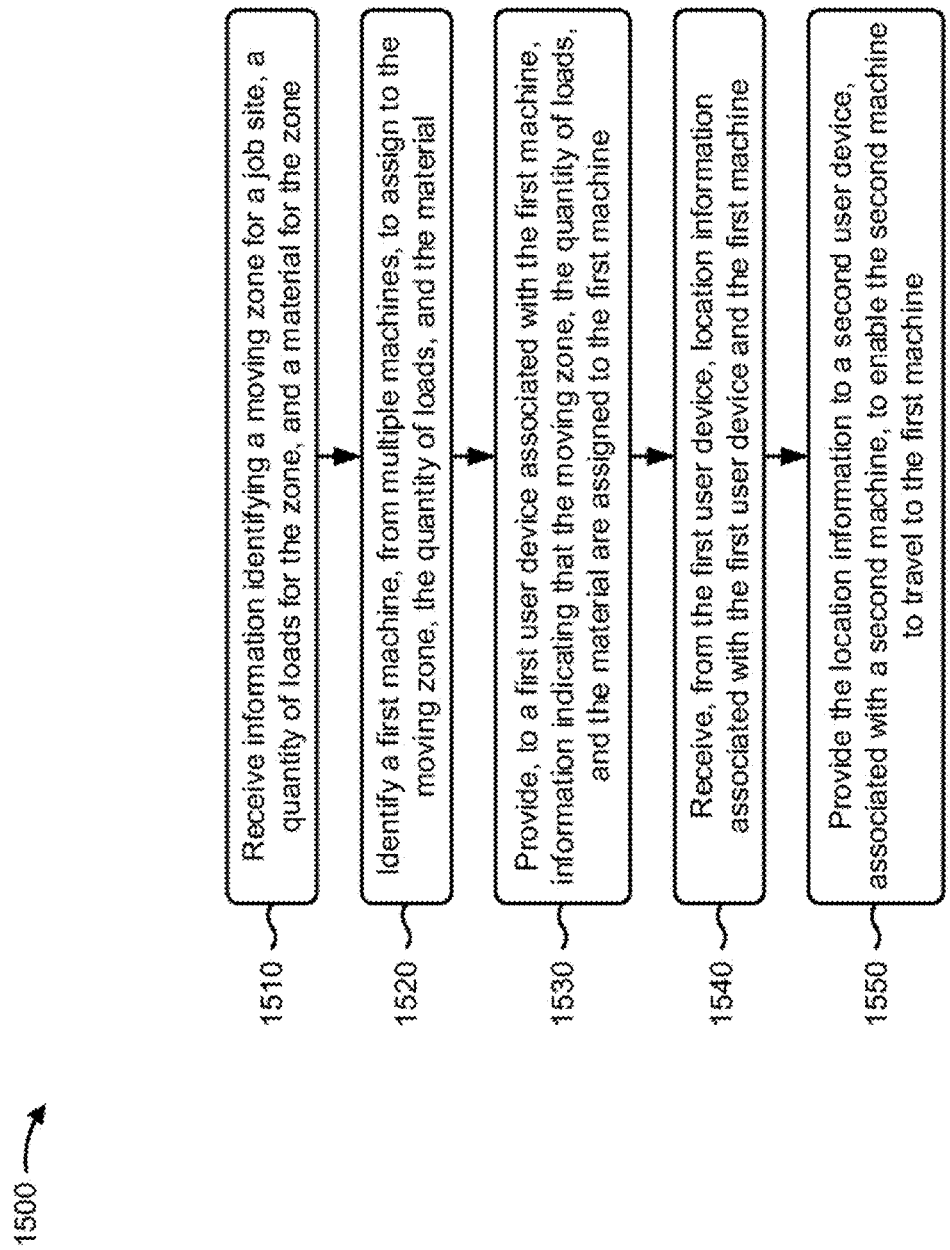

MANAGING MATERIAL HANDLING PRODUCTIVITY

TECHNICAL FIELD

The present disclosure relates generally to material handling, and, more particularly, to a management platform that manages material handling productivity.

BACKGROUND

A construction job site may include multiple earth-moving machine, such as dump trucks, excavators, continuous miners, loaders, pavers, and/or the like, and responsible persons associated with different machines. The machines often engage with and/or move a variety of earthen materials from one location of a job site to another location of the job site or another job site. Operators of the machines may be compensated based on quantities of material loads delivered, moved, processed, and/or the like. The machines may also be tracked to determine the quantities of material loads and the productivity of the machines.

Conventional techniques for tracking machines and determining machine productivity include utilizing telemetry data provided by embedded or retrofit hardware attached to the machines at job sites. Such telemetry data may be used in an effort to improve earth-moving productivity. However, the embedded or retrofit hardware is expensive, and many job sites have complex material processing situations and/or utilize short-term, rented machines that do not have the embedded or retrofit hardware. As a result, the telemetry data received from the hardware may be incorrect or non-existent, and determining machine productivity may require manual validation of the quantities of material loads.

One worksite system is disclosed in U.S. Patent Application Publication No. 2010/0312599 that published in the name of Durst on Dec. 9, 2010 ("the '599 patent publication"). In particular, the '599 patent publication discloses a worksite system for measuring productivity of a machine. The worksite system may generate a digital map of a worksite with goo-fences defined. Each different geo-fence may be marked and may demarcate a subsection of the area represented by the digital map. A machine may be represented on the digital map, and may not be inside or at a perimeter of any of the geo-fences. This information may be reported by the worksite system to a worksite manager and/or a machine operator and may be useful in helping to assess a productivity of the machine. The machine may include an interface control device that includes components for automatically gathering information from the machine during the operation of the machine. For example, the interlace control device may include a locating device, an interface control module, and a controller for communicating with the worksite system.

While the worksite system of the '599 patent publication discloses defining geo-fences for a worksite and tracking information from the machine, the interface control device may be hardware that is embedded or retrofit into the machine. Furthermore, the interface control device may be expensive, complex, and difficult to operate for a machine operator. Thus, the interface control device may be incorrectly operated or may not be utilized at all by the machine operator.

The management platform of the present disclosure solves one or more of the problems set forth above and/or other problems in the art.

SUMMARY

According to some implementations, the present disclosure is related to a device that includes one or more memory devices, and one or more processors, operatively coupled to the one or more memory devices, to receive information identifying a moving load zone for it job site, a quantity of loads for the moving load zone, and a material for the moving loud zone, and identity a first machine, from multiple machines, to assign to the moving load zone, the quantity of loads, and the material. The one or more processors may provide, to a first user device associated with the first machine, information indicating that the moving load zone, the quantity of loads, and the material are assigned to the first machine. The one or more processors may receive, from the first user device, location information associated with the first user device and the first machine, and may provide the location information to a second user device associated with a second machine that is to receive loads from the first machine. The one or more processors may calculate a loading time for loading the material by the first machine and at a particular time, may calculate a quantity of loads handled by the first machine and at the particular time, and may perform an action based on the loading time and the quantity of loads.

According to some implementations, the present disclosure is related to a non-transitory computer-readable medium storing instructions that include one or more instructions that, when executed by one or more processors of a device, cause the one or more processors to receive information identifying a moving dump zone for a job site, a quantity of loads for the moving dump zone, and a material for the moving dump zone, and identify a first machine, from multiple machines, to assign to the moving dump zone, the quantity of loads, and the material. The one or more instructions may cause the one or more processors to provide, to a first user device associated with the first machine, information indicating that the moving dump zone, the quantity of loads, and the material are assigned to the first machine, and receive, front the first user device, location information associated with the first user device and the first machine. The one or more instructions may cause the one or more processors to provide the location information to a second user device associated with a second machine that is to provide loads to the first machine, and calculate a processing time for processing the material by the first machine and at a particular time. The one or more instructions may cause the one or more processors to calculate a quantity of loads handled by the first machine and at the particular time, and perform an action based on the processing time and the quantity of loads.

According to some implementations, the present disclosure is related to a method that includes receiving information identifying a moving zone for a job site, a quantity of loads for the moving zone, and a material for the moving zone, and identifying, a first machine, from multiple machines, to assign to the moving zone, the quantity of loads, and the material. The method may include providing, to a first user device associated with the first machine, information indicating that the moving zone, the quantity of loads, and the material are assigned to the first machine. The method may include receiving, from the first user device, location information associated with the first user device and the first machine, and providing the location information to a second user device, associated with a second machine, to enable the second machine to travel to the first machine.

BRIEF DESCRIPTION OF THE DRAWINGS

FIGS. 13-15 are flow charts of example processes for managing material handling productivity.

DETAILED DESCRIPTION

Figure 1:
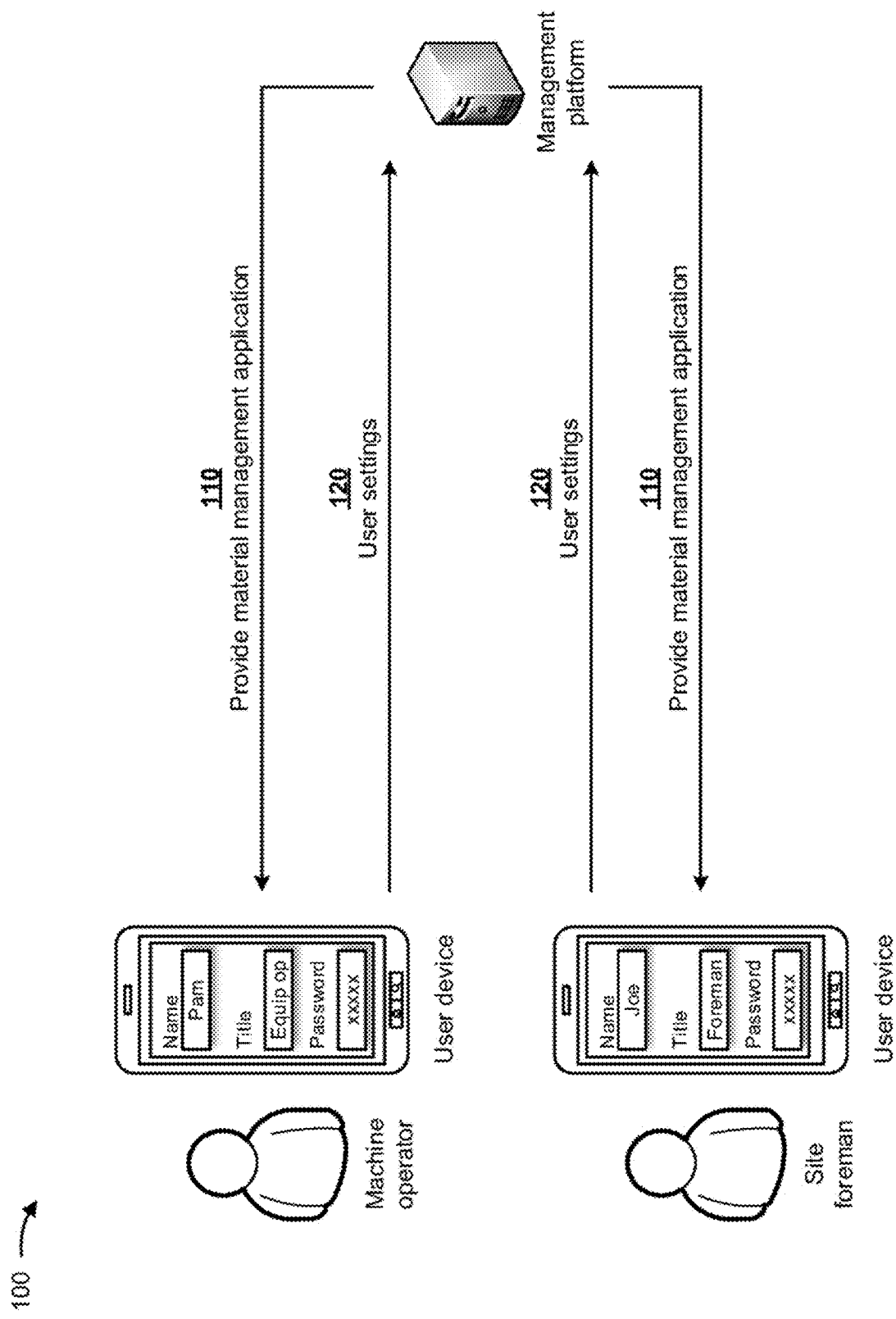
FIGS. 1-10 are diagrams of example implementations described herein.

This disclosure relates to a management platform that manages material handling productivity. The management platform has universal applicability to any machine that handles earthen materials, such as a dump truck, a bulldozer, an excavator, a continuous miner, a loader, a paver, a steamroller, a harvester, a logging machine, a garbage truck, a backhoe, and/or the like.

FIGS. 1-10 are diagrams or example implementations described herein. As shown in example implementation 100 of FIG. 1, a first user device may be associated with a machine operator, a second user device may be associated with a site foreman, and the user devices may be associated with a management platform. As further shown in FIG. 1, and by reference number 110, the management platform may provide a material management application to the first user device and the second user device. In some implementations, the first user device and/or the second user device may request the material management application from the management platform, and may download the material management application from the management platform (e.g., with approval of the management platform). In some implementations, the material management application may include an application that enables management of material delivery productivity, site planning, visualization of analytics results, monitoring of a job site, and/or the like (e.g., by the management platform, the machine operator, the site foreman, and/or the like).

In some implementations, the machine operator and the site foreman may install the material management application on the first user device and the second user device, respectively, and may provide user settings for the material management application. In some implementations, the user settings may include information indicating a user name (e.g., Pam for the machine operator and Joe for the site foreman), a title of the user (e.g., equipment operator and foreman), a password for the application, whether the user prefers to work at particular job sites, whether the user prefers to work on particular days or at particular times, whether the user prefers to work with particular materials, whether the user prefers to receive alerts associated with the job site, whether the user prefers to receive material delivery productivity data, a calendar of the user, user information (e.g., years of experience, experience on similar jobs, ratings, when the user last worked, etc.), machine information (e.g., where the machine is located, an age of the machine, a maintenance record of the machine, a future scheduled maintenance or repair for the machine, how many kilometers are on the machine, how many kilometers are on tires and/or tread on the machine), and/or the like. As further shown in FIG. 1, and by reference number 120, the management platform may receive the user settings from the first user device and the second user device, and may store the user settings in a memory associated with the management platform.

Figure 2:
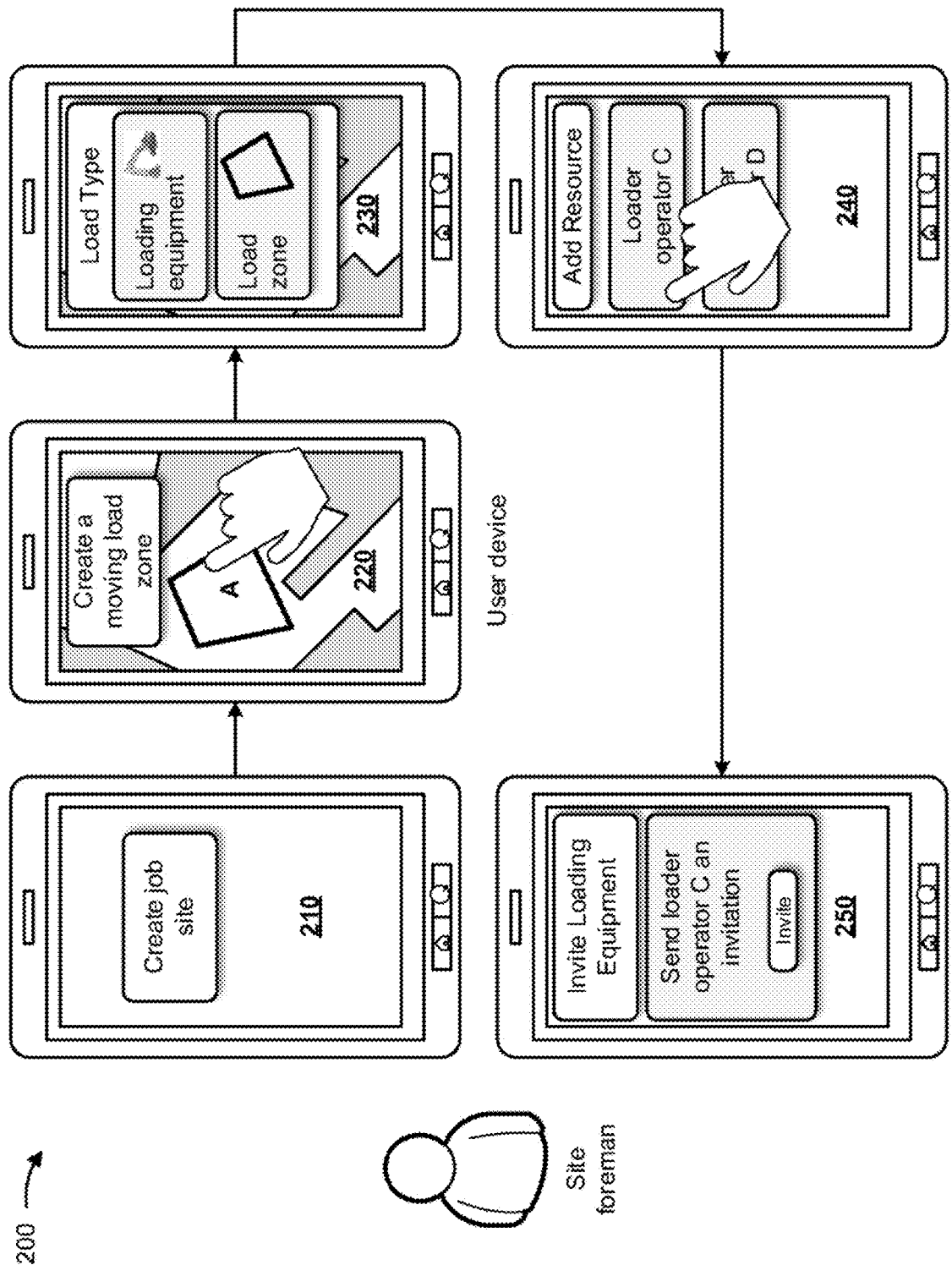

As shown in example implementation 200 of FIG. 2, the site foreman may utilize the material management application, via the user device, to manage a job site. For example, as shown by reference number 210, the user device may provide for display, to the site foreman, a user interface that enables the site foreman to create a job site. In some implementations, the site foreman may utilize the user interface to retrieve (e.g., from a memory of the user device or front another source) a visual rendering of the job site. The visual rendering of the job site may include a satellite image, a topographical map, a topological map, a dot map, a road map, a hybrid map, and/or the like of the job site.

As further shown in FIG. 2, and by reference number 220, the user device may provide for display, to the site foreman, a user interface that provides the visual rendering of the job site and enables the site foreman to create moving load zones (e.g., zones where a machine loads a material for hauling and that move with a location of the machine) for the job site. As further shown by reference number 220 in FIG. 2, the user interlace may enable the site foreman to define the moving load zones via the visual rendering of the job site. In some implementations, to create moving load zones (e.g., moving load zone A), the site foreman may utilize a finger or a stylus with the user interface to create multi-polygon geographical boundaries or geo-fences that represent the moving load zones. In such implementations, the site foreman may utilize the finger or the stylus to tap a particular quantity of corners for a polygon that represents a moving load zone.

In some implementations, the site foreman need not create moving load zones, and the moving load zones may be automatically defined by a location of a machine that performs the loading (e.g., an excavator, a loader, and/or the like). In such implementations, the management platform may track the location of the loading machine (e.g., via a user device associated with the loading machine), and may assign a moving load zone to the location of the loading machine. The location of the moving load zone, in such implementations, may change as the loading machine moves around the job site. In such implementations, the user interface may automatically provide, as the moving load zone, a circle with a predetermined radius and a center representing the location of the loading machine. The site foreman may utilize the finger or the stylus with the user interface to edit the predetermined radius of the circle, to edit a center of the circle, to change the circle to another shape (e.g., a multi-polygon) as shown in FIG. 2, and/or the like. The circle or the multi-polygon may provide a geographical boundary or a geo-fence that represents the moving load zone.

In some implementations, the site foreman may create stationary loud zones by utilizing a finger or a stylus with the user interface to create multi-polygon geographical boundaries or geo-fences that represent the load zones. In such implementations, the loading machines associated with the stationary load zones may move to different locations within the stationary load zones. The management platform may track the locations of the loading machines (e.g., via user devices associated with the loading machines) within the stationary load zones, and may share the locations with other machines (e.g., dump trucks) that may interact with the loading machines.

As further shown in FIG. 2, and by reference number 230, the user device may provide for display, to the site foreman, a user interface that enables the site foreman to define load type information for the moving load zone. For example, the site foreman may utilize the user interface to specify a type of machine (e.g., loading equipment) for the moving load zone, the moving load zone (e.g., moving load zone A) for the type of machine, and/or the like.

Once the site foreman provides the load type information, and as further shown by reference number 240 in FIG. 2, the user device may provide for display, to the site foreman, a user interface that enables the site foreman to select one or more machines for the moving load zone. In some implementations, the management platform may provide, to the user device, a list of machines and/or operators of the machines that are available for the moving load zone. For example, the user interface may include information indicating that operators of loading equipment (e.g., loader operator C, loader operator D, etc.) are available for the moving load zone. As further shown in FIG. 2, assume that the site foreman selects loader operator C for the moving load zone (e.g., moving load zone A).

In some implementations, the management platform may determine the list of machines and/or operators based on information associated with the machines and/or the operators, such as it calendar of the operator, operator information (e.g., years of experience, experience on similar jobs, ratings, when the operator last worked, etc.), machine information (e.g., where the machine is located, an age of the machine, a maintenance record of the machine, a future scheduled maintenance or repair for the machine, how many kilometers are on the machine, how many kilometers are on tires and/or tread on the machine), and/or the like. In some implementations, the management platform may determine a list of top X machines and/or operators based on the information associated with the machines and/or the operators. In some implementations, the management platform may train a model to generate scores for the operator and machine combinations, and may select the top X machines and/or operators based on the scores.

When the site foreman selects the machines for the moving load zone, and as further shown by reference number 250 in FIG. 2, the user device may provide for display, to the site foreman, a user interface that enables the site foreman to send invitations to operators of the selected machines. For example, the user interface may include information indicating whether an invitation should be sent to an operator (e.g., loader operator C) of a selected machine (e.g., loading equipment) for the moving load zone (e.g., moving load zone A). In some implementations, if the site foreman selects to send invitations to the operators of the selected machines, the management platform may provide the invitations to user devices associated with the operators, as described below.

Figure 3:
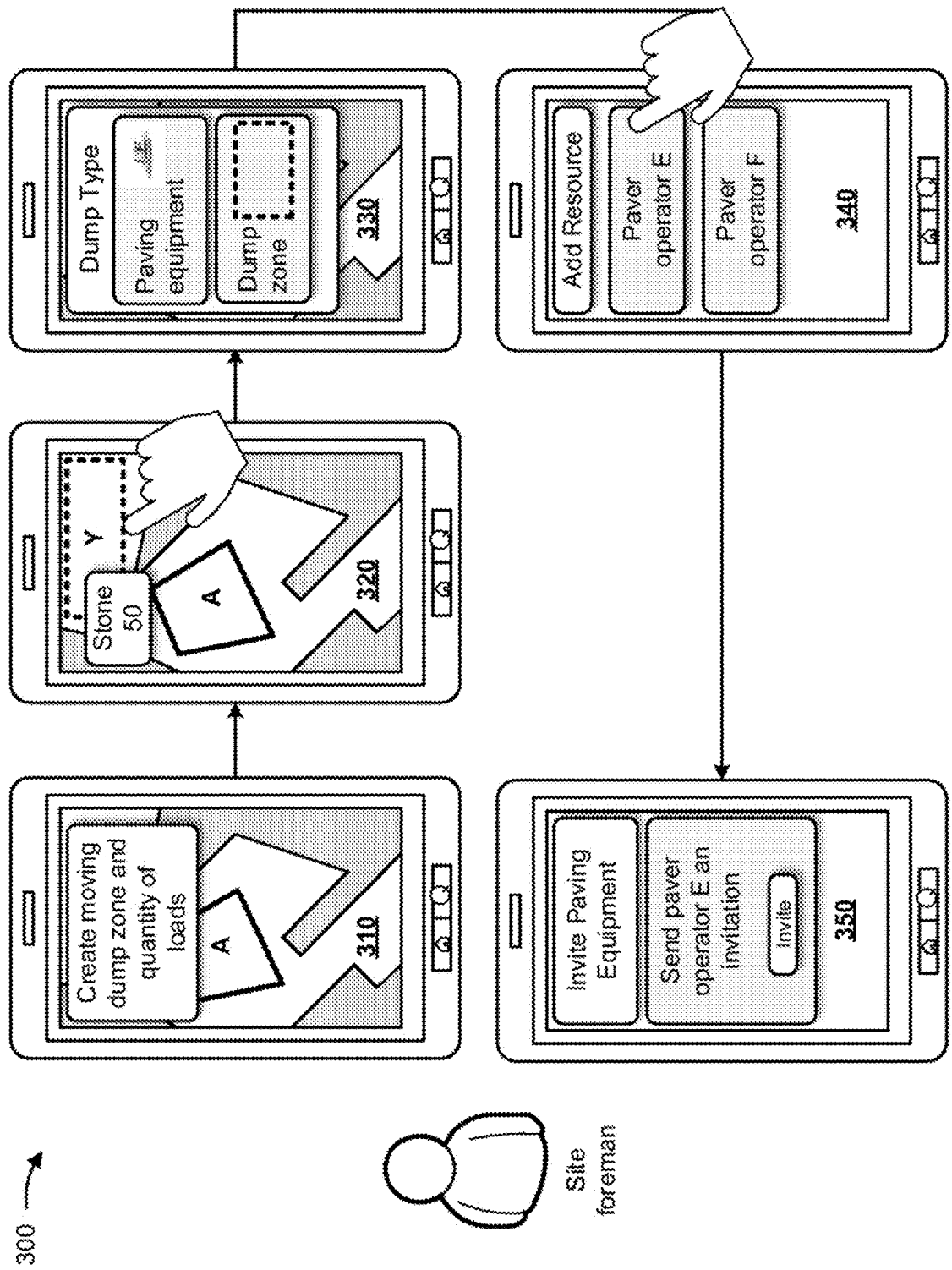

As shown in example implementation 300 of FIG. 3, and by reference number 310, the user device may provide for display, to the site foreman, a user interface that provides the visual rendering of the job site and enables the site foreman to create moving dump zones for the job site and a quantity of loads associated with the job site. As further shown in FIG. 3, and by reference number 320, the user device may provide for display, to the site foreman, a user interface that enables the site foreman to define the moving dump zones via the visual rendering of the job site. In some implementations, to create moving dump zones (e.g., moving dump zone Y), the site foreman may utilize a finger or a stylus with the user interface to create multi-polygon geographical boundaries or geo-fences that represent the moving dump zones. In such implementations, the site foreman may utilize the finger or the stylus to tap a particular quantity of corners for a polygon that represents a moving dump zone.

In some implementations, the site foreman need not create moving dump zones, and the moving dump zones may be automatically defined by a location of a machine that processes a load (e.g., a bulldozer, a paver, a steamroller, and/or the like). In such implementations, the management platform may track the location of the processing machine (e.g., via a user device associated with the processing machine), and may assign a moving dump zone to the location of the processing machine. The location of the moving dump zone, in such implementations, may change as the processing machine moves around the job site (e.g., a paver may move as road is being paved). In such implementations, the user interface may automatically provide, as the moving dump zone, a circle with a predetermined radius and a center representing the location of the processing machine. The site foreman may utilize the finger or the stylus with the user interface to edit the predetermined radius of the circle, to edit a center of the circle, to change the circle to another shape (e.g., a multi-polygon) as shown in FIG. 3, and/or the like. The circle or the multi-polygon may provide a geographical boundary or a geo-fence that represents the moving dump zone.

In some implementations, the site foreman may create stationary dump zones by utilizing a finger or a stylus with the user interface to create multi-polygon geographical boundaries or geo-fences that represent the dump zones. In such implementations, the processing machines associated with the stationary dump zones may move to different locations within the stationary dump zones. The management platform may track the locations of the processing machines (e.g., via user devices associated with the processing machines) within the stationary load zones, and may share the locations with other machines (e.g., dump trucks) that may interact with the processing machines.

As further shown in FIG. 3, and by reference number 320, the user interface may enable the site foreman to define materials for the moving load zones and the moving dump zones, and a quantity of loads for dumping at the moving dump zones. For example, the site foreman may indicate, via the user interface, that fifty (50) loads of stone, from moving load zone A, are to be dumped at moving dump zone Y.

As further shown in FIG. 3, and by reference number 330, the user device may provide for display, to the site foreman, a user interface that enables the site foreman to define dump type information for the moving dump zone. For example, the site foreman may utilize the user interface to specify a type of machine (e.g., paving equipment) for the moving dump zone, the moving dump zone (e.g., moving dump zone Y) for the type of machine, and/or the like.

Once the site foreman provides the dump type information, and as further shown by reference number 340 in FIG. 3, the user device may provide for display, to the site foreman, a user interface that enables the site foreman to select one or more machines for the moving dump zone. In some implementations, the management platform may provide, to the user device, a list of machines and/or operators of the machines that are available for the moving dump zone. For example, the user interface may include information indicating that operators of paving equipment (e.g., paver operator E, paver operator F, etc.) are available for the moving dump zone. As further shown in FIG. 3, assume that the site foreman selects paver operator E for the moving dump zone (e.g., moving dump zone Y).

In some implementations, the management platform may determine the list of machines and/or operators based on information associated with the machines and/or the operators, such as a calendar of the operator, operator information (e.g., years of experience, experience on similar jobs, ratings, when the operator last worked, etc.), machine information (e.g., where the machine is located, an age of the machine, a maintenance record of the machine, a future scheduled maintenance or repair for the machine, how many kilometers are on the machine, how many kilometers are on tires and/or tread on the machine), and/or the like. In some implementations, the management platform may determine a list of top X machines and/or operators based on the information associated with the machines and/or the operators. In some implementations, the management platform may train a model to generate scores for the operator and machine combinations, and may select the top X machines and/or operators based on the scores.

When the site foreman selects the machines for the moving dump zone, and as further shown by reference number 350 in FIG. 3, the user device may provide for display, to the site foreman, a user interface that enables the site foreman to send invitations to operators of the selected machines. For example, the user interface may include information indicating whether an invitation should be sent to an operator (e.g., paver operator E) of a selected machine (e.g., paving equipment) for the moving dump zone (e.g., moving dump zone Y). In some implementations, if the site foreman selects to send invitations to the operators of the selected machine, the management platform may provide the invitations to user devices associated with the operators, as described below.

In some implementations, the site foreman may continue to utilize the material management application to define other job sites, load zones, dump zones, materials, quantity of loads, machines, operators, and/or the like.

Figure 4:
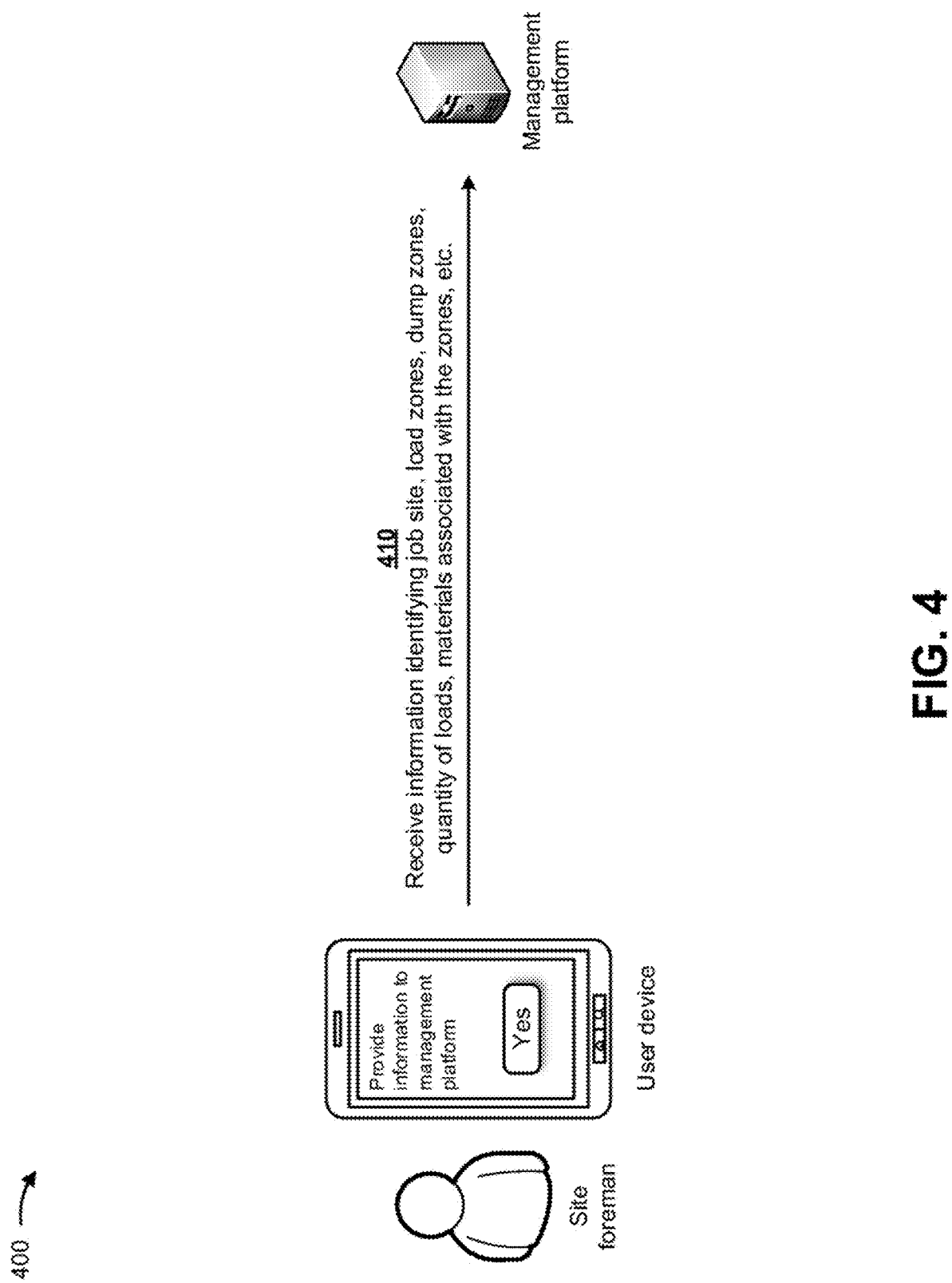

As shown in example implementation 400 of FIG. 4, and by reference number 410, the management platform may receive information identifying the job site, the load zones, the dump zones, the quantity of loads, the materials associated with the zones, the invitations to operators of selected machines, and/or the like. In some implementations, when the site foreman has provided all of the information for the job site, the user device may provide an option to provide the information to the management platform. When the site foreman selects the option, the selection of the option may cause the user device to provide, to the management platform, the information identifying the job site, the load zones, the dump zones, the quantity of loads, the materials associated with the zones, the invitations to operators of selected machines, and/or the like. In some implementations, the management platform may store the information identifying the job site, the load zones, the dump zones, the quantity of loads, the materials associated with the zones, the invitations to operators of selected machines, and/or the like, in a memory associated with the management platform.

Figure 5:
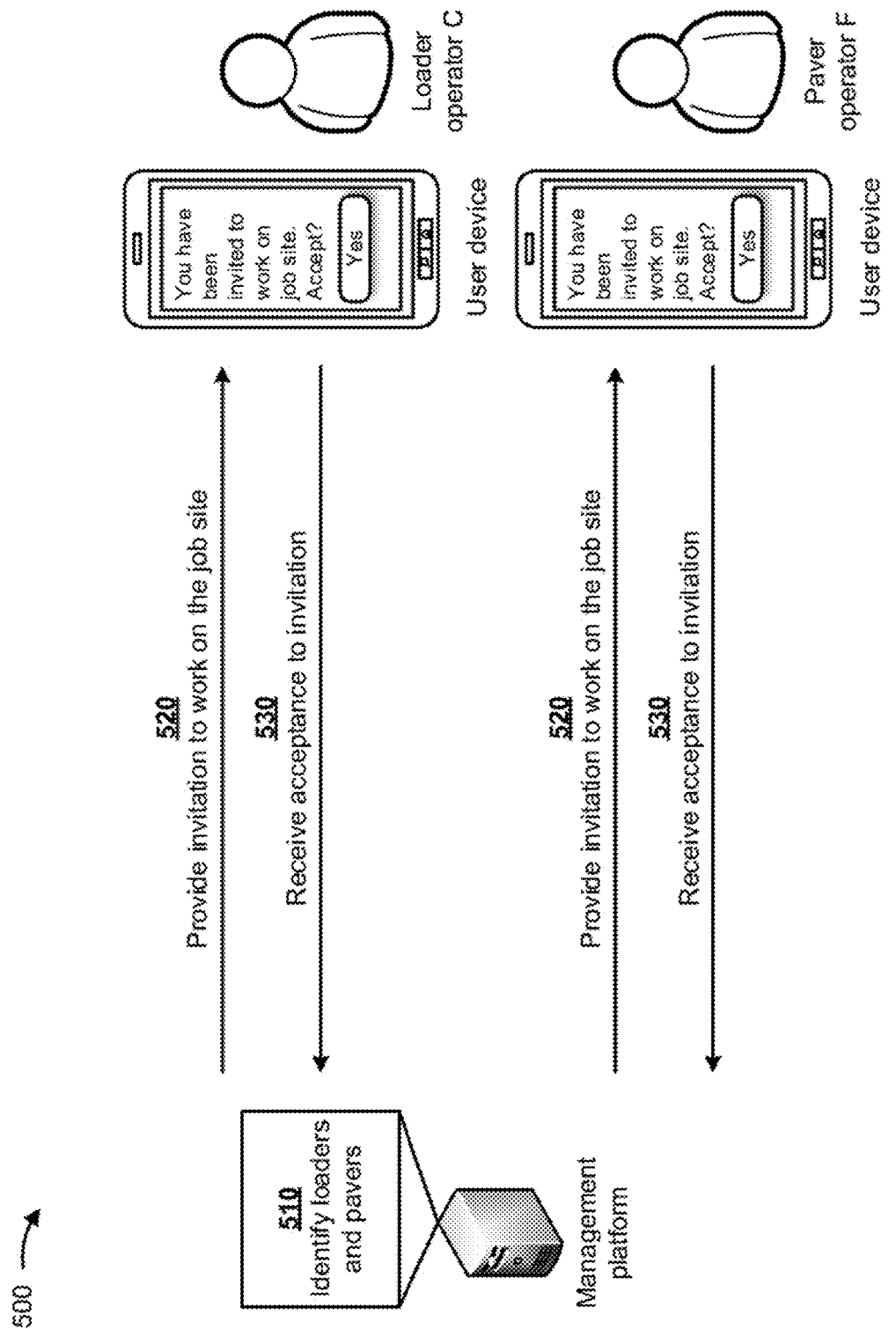

As shown in example implementation 500 of FIG. 5, and by reference number 510, instead of the site foreman selecting machines for the job site, the management platform may identify one or more machines (e.g., loaders and pavers), from multiple machines available for the job site, to assign to the job site (e.g., for loading, paving, hauling, and dumping materials). In some implementations the management platform may utilize a variety of information (e.g., associated with the multiple machines) to identify or select the one or more machines from the multiple machines. For example, the management platform may utilize machine operator information (e.g., years of experience, experience on similar jobs, ratings, when the machine operators last worked, etc.), where machines are located, ages of the machines, maintenance records of the machines, future scheduled maintenance or repair for the machines, how many kilometers are on the machines, how many kilometers are on tires and/or tracts of the machines, weather forecast information, geographical topography information for the job site (e.g., hills, valleys, flat, etc.), information about a condition associated with the job site (e.g., muddy, dusty, paved roads, etc.), and/or the like.

In some implementations, the management platform may assign weights to the variety of information used to identify the one or more machines, and may determine scores for the multiple machines based on the weights. The management platform may assign ranks to the multiple machines based on the scores, and may identify the one or more machines based on the ranks of the multiple machines. For example, if the job site requires five loaders, the management platform may identify five loaders with the highest ranks for the job site. In some implementations, the management platform may identify the one or more machines based on utilizing one or more machine learning models, such as a decision tree learning model, an artificial neural network model, an inductive logic programming model, a support vector machine model, a clustering model, a Bayesian network model, and/or the like.

In some implementations, the management platform may identify the one or more machines, from the multiple machines available for the job site, to assign to the job site, and the site foreman may select machines from the identified machines and may invite operators of the selected machines, as described above in connection with FIGS. 2 and 3.

As further shown in FIG. 5, and by reference number 520, once the management platform identifies the one or more machines (e.g., loaders and pavers), the management platform may provide invitations, to work on the job site, to user devices associated with the one or more machines. For example, the management platform may provide an invitation, to work on the job site, to a user device associated with loader operator C, another invitation, to work or the job site, to a user device associated with paver operator F, and/or the like.

The user devices may receive the invitations, and may provide, for display, user interfaces indicating the invitation to work on the job site. The user interfaces may also enable loader operator C and paver operator F to accept the invitations to work on the job site, which may cause the user devices to provide acceptances to the management platform. As further shown in FIG. 5, and by reference number 530, if the operators accept the invitations, the management platform may receive acceptances to the invitations from the user devices associated with loader operator C and paver operator F.

Figure 6:
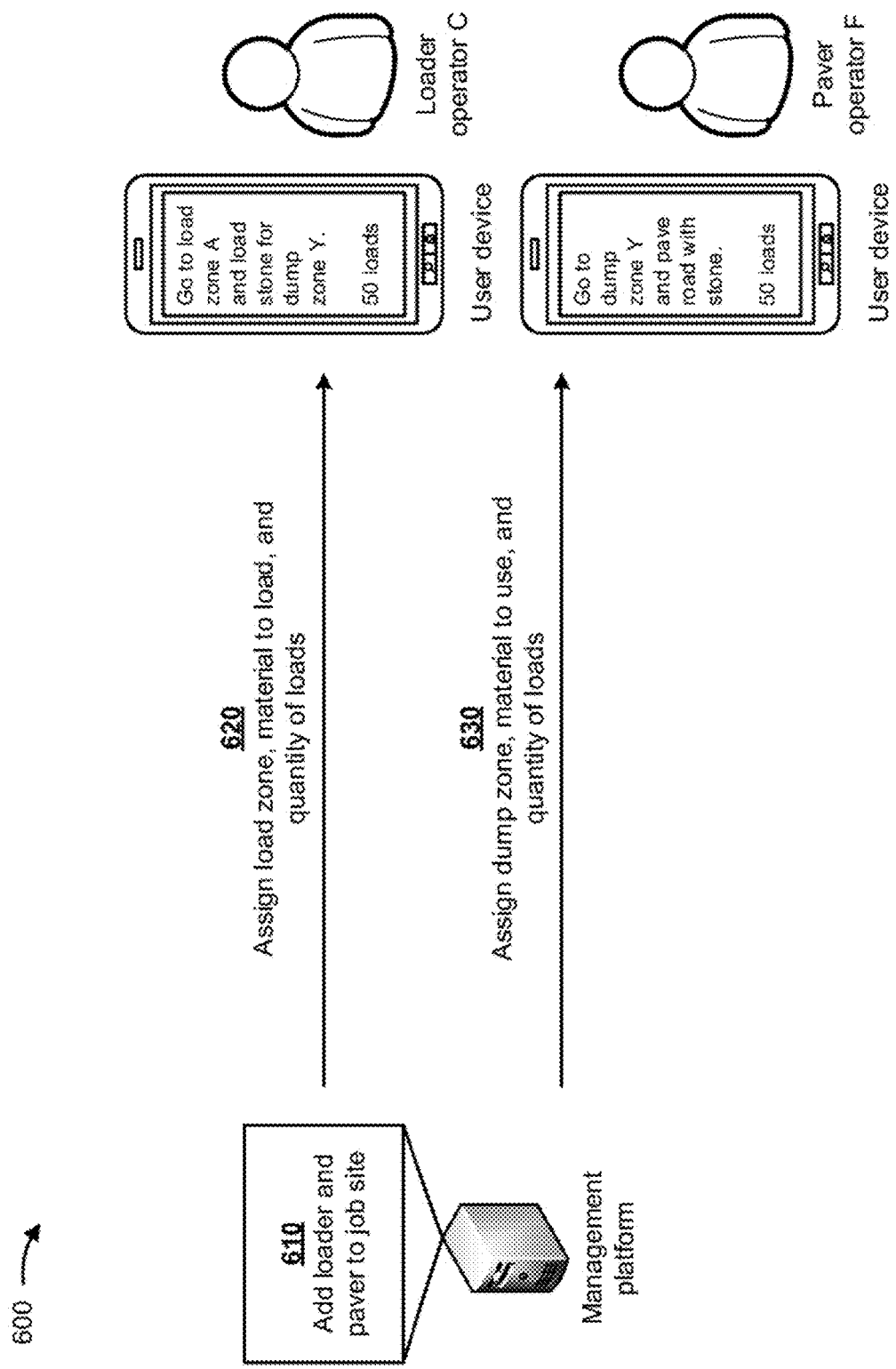

As shown in example implementation 600 of FIG. 6, and by reference number 610, the management platform may add the machines (e.g., the paver and the loader) to the job site. In some implementations, by adding the paver and the loader to the job site, the management platform may indicate that the paver and the loader are available to perform work (e.g., loading, paving, and/or the like) on the job site.

As further shown in FIG. 6, and by reference numbers 620 and 630, the management platform may provide assignments, associated with the job site, to user devices associated with the machines. For example, the management platform may provide an alignment to the user device associated with loader operator C, another assignment to the user device associated with paver operator F, and/or the like. In some implementations, each assignment may include information indicating that a load zone, a dump zone, a quantity of loads, a material to load or user, and/or the like, are assigned to the machine (e.g., the loader, the paver, etc.). In some implementations, the user device may provide, for display (e.g., via a user interface), the information included in the assignments. For example, the user device for loader operator C may indicate that loader operator C is to utilize the loader to load fifty (50) loads of stone from load zone A, and that the stone is to be dumped at dump zone Y. In another example, the user device for paver operator F may indicate that paver operator F is to utilize the paver to pave a road at dump zone Y with the fifty (50) loads of stone provided from load zone A.

In some implementations, the assignments may include navigation information that provides directions to and from load zones and dump zones associated with different machines. For example, the assignment may cause the user device associated with loader operator C to provide navigation information to load zone A. In another example, the assignment may cause the user device associated with paver operator F to provide navigation information to dump zone Y.

In some implementations, if a machine is an autonomous vehicle, the management platform may provide an assignment to the machine, and the assignment may include instructions for performing tasks on the job site. For example, if the machine is an autonomous loader, the management platform may provide, to the loader, instructions that cause the loader to travel to a load zone and repeatedly load material from the load zone into dump trucks for hauling the material to a dump zone.

Figure 7:
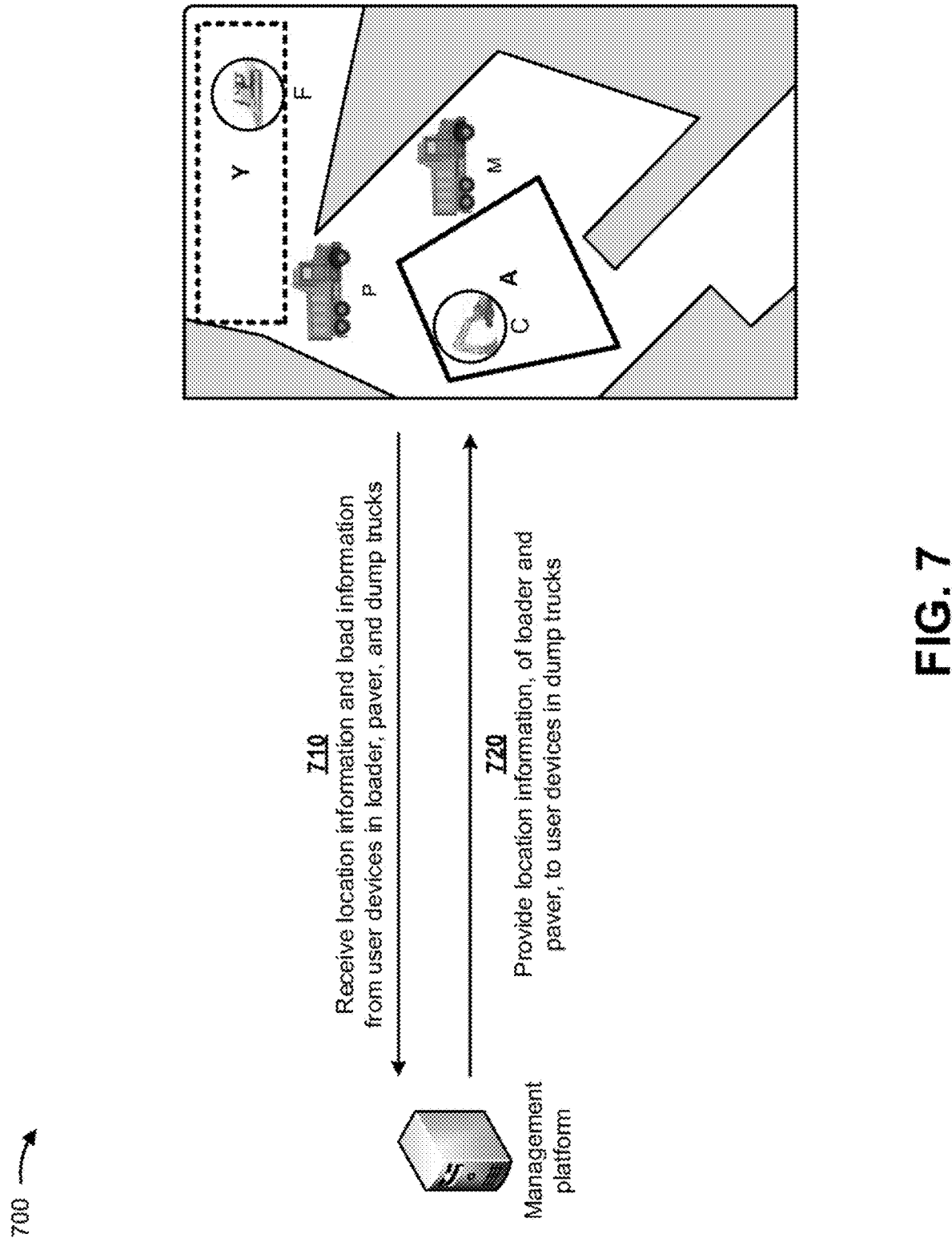

As shown in example implementation 700 of FIG. 7, and by reference number 710, the management platform may receive, from user devices associated with the machines and over a time period (e.g., in minutes, hours days, weeks, etc.), location information associated with the user devices and the machines and load information associated with the machines. In some implementations, the location information for the machines may be the same as associated user devices since the user devices may be physically provided in the machines. In some implementations, the management platform may continuously track locations of all machines working on the job site based on locations (e.g., global positioning system (GPS) coordinates) of the user devices provided in the machines. Since many of the machines (e.g., loaders, pavers, dump trucks, etc.) on the job site move around the job site, the management platform may continuously track current locations of such machines.

In some implementations, the machines may include sensors (e.g., that communicate with the management platform and/or user devices) that provide the load information indicating a quantity of times a loader provided a load to a dump truck, a quantity of times a dump truck dumps a bad, a quantity of times a loader bucket engages the ground, is filled, and is emptied, a quantity of times a paver engages materials, moves the materials, and creates a portion of a paved road, a quantity of times a bulldozer engages materials and moves materials, and/or the like.

For example, assume that user devices are provided in dump truck M, dump truck P, loader C, and paver F shown in FIG. 7. In such an example, the management platform may track the locations of dump truck M, dump truck P, loader C, and paver F based on the locations of user devices provided in dump truck M, dump truck P, loader C, and paver F. As shown, loader C may be located within a portion of load zone A, dump truck M may be located near load zone A, dump truck P may be located near dump zone Y, and paver F may be located within a portion of dump zone Y, at a particular time. In some implementations, the management platform may store the location information associated with the user devices and the machines in a memory associated with the management platform.

As further shown in FIG. 7, and by reference number 720, the management platform may provide the location information, associated with loader C and paver F, to the user devices provided in dump truck M and dump truck P. In some implementations, the management pint form may provide, to the user devices in dump truck M and dump truck P, navigation information that provides directions to the locations of loader C and paver F. For example, the management platform may provide location information and navigation information, associated with loader C, to the user device in dump truck M so that dump truck M may locate and receive loads from loader C. In another example, the management platform may provide location information and navigation information, associated with paver F, to the user device in dump truck P so that dump truck P may locale and provide loads to paver F.

Figure 8:
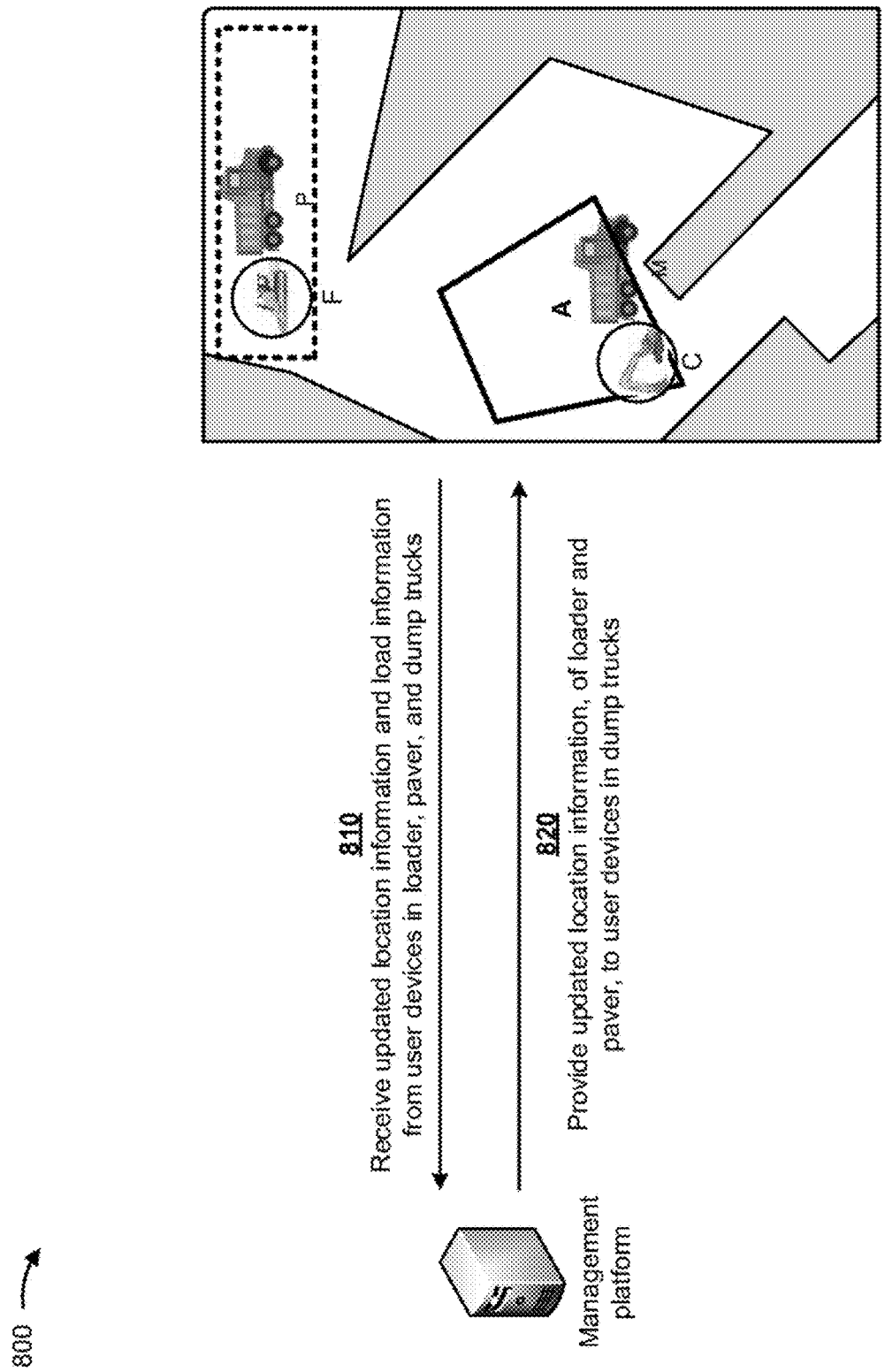

As shown in example implementation 800 of FIG. 8, and by reference number 810, the management platform may receive, from user devices associated with the machines, updated location information associated with the user devices and the machines and updated load information associated with the machines. In some implementations, the updated location information for the machines may include the location information associated with the user devices and the machines, as described above in connection with FIG. 7, at another particular time (e.g., after the particular time of FIG. 7). In some implementations, the updated load information associated with the machines may include the load information associated with the machines, as described above in connection with FIG. 7, at the other particular time.

For example, the management platform may track the locations of dump truck M, dump truck P, loader C, and paver F based on the locations of user devices provided in dump truck M, dump truck P, loader C, and paver F. As shown, loader C may be located within a different portion of load zone A (e.g., than shown in FIG. 7), dump truck M may be located next to loader C, dump truck P may be located next to paver F, and paver F may be located within a different portion of dump zone Y (e.g., than shown in FIG. 7), at the other particular time. In some implementations, the management platform may store the updated location information associated with the user devices and the machines in a memory associated with the management platform.

As further shown in FIG. 8, and by reference number 820, the management platform may provide the updated location information, associated with loader C and paver F, to the user devices provided in dump truck M and dump truck P. In some implementations, the management platform may provide, to the user devices in dump truck M and dump truck P, navigation information that provides directions to the locations of loader C and paver F.

In this way, the management platform may enable machines to locale and interact with moving load zones and moving dump zones. For example, the management platform may enable dump truck M to locate and receive loads from loader C, even when loader C is moving around load zone A. In another example, the management platform may enable dump truck P to locate and provide loads to paver F, even when paver F is moving around dump zone Y. In this way, the management platform may enable dump trucks to more easily locate loaders and/or pavers, especially when load zones and/or dump zones are large, include obstructions that make locating loaders and/or pavers difficult, include a large volumes of loaders and/or pavers, and/or the like.

In some implementations, the management platform may utilize the location information associated with the machines, the updated location information associated with the machines, the load information associated with the machines, and the updated load information associated with the machines to determine productivity information for the machines.

In some implementations, the management platform may determine statuses of a machine (e.g., a loader) over a time period and based on the location information and loading information associated with the machine. In some implementations, the management platform may determine that the loader status is loading when sensors, associated with the loader (e.g., communicating with the management platform and/or the user device), provide information indicating that the loader is loading a material (e.g., in a dump truck). In some implementations, the management platform may determine that the loader is idle (e.g., not loading) when the sensors, associated with the loader, provide information indicating that the loader is not loading a material.

In some implementations, the management platform may determine that the loader status is moving within a load zone (e.g., creating a moving load zone) when the locations of the loader indicate that the loader is moving and is within the load zone. In such implementations, the management platform may calculate a distance traveled by the loader, an average speed of the loader, a path traveled by the loader, and/or the like, based on the locations of the loader.

In some implementations, the management platform may determine a quantity of time that the loader is loading based on time periods associated with when the loader is loading material, may determine a quantity of time that the loader is idle based on time periods associated with when the loader is idle and/or moving within the load zone, and/or the like. In such implementations, the management platform may determine a percentage of time that the leader is loading by dividing the quantity of time that the loader is loading by a total quantity of time that the loader is on the job site, may determine a percentage of time that the loader is idle by dividing the quantity of time that the loader is idle and/or moving within the load zone by the total quantity of time that the loader is on the job site, and/or the like.

In some implementations, the management platform may determine a load count for the loader by adding a quantity of times that the sensors associated with the loader provide information indicating that the loader is loading a material.

In some implementations, the management platform may determine statuses of another machine (e.g., a paver) over a time period and based on the location information and loading information associated with the machine. In some implementations, the management platform may determine that the paver status is paving when sensors associated with the paver (e.g., communicating with the management platform and/or the user device) provide information indicating that the paver is paving a load of a material (e.g., provided by a dump truck). In some implementations, the management platform may determine that the paver is idle (e.g., not paving) when the sensors associated with the paver provide information indicating that the paver is not paving a load of a material.

In some implementations, the management platform may determine that the paver status is moving within a dump zone (e.g., creating a moving dump zone) when the locations of the paver indicate that the paver is moving and is within the dump zone. In such implementations, the management platform may calculate a distance traveled by the paver, an average speed of the paver, a path traveled by the paver, and/or the like, based on the locations of the paver.

In some implementations, the management platform may determine a quantity of time that the paver is paving a load of a material based on time periods associated with when the paver is paving a load of a material, may determine a quantity of time that the paver is idle based on time periods associated with when the paver is idle and/or moving within the dump zone, and/or the like. In such implementations, the management platform may determine a percentage of time that the paver is paving by dividing the quantity of time that the paver is paving by a total quantity of time that the paver is on the job site, may determine a percentage of time that the paver is idle by dividing the quantity of time that the paver is idle and/or moving within the dump zone by the total quantity of time that the paver is on the job site, and/or the like.

In some implementations, the management platform may determine a load count for the paver by adding a quantity of times that the sensors associated with the paver provide information indicating that the paver is paving a load of material.

Figure 9:
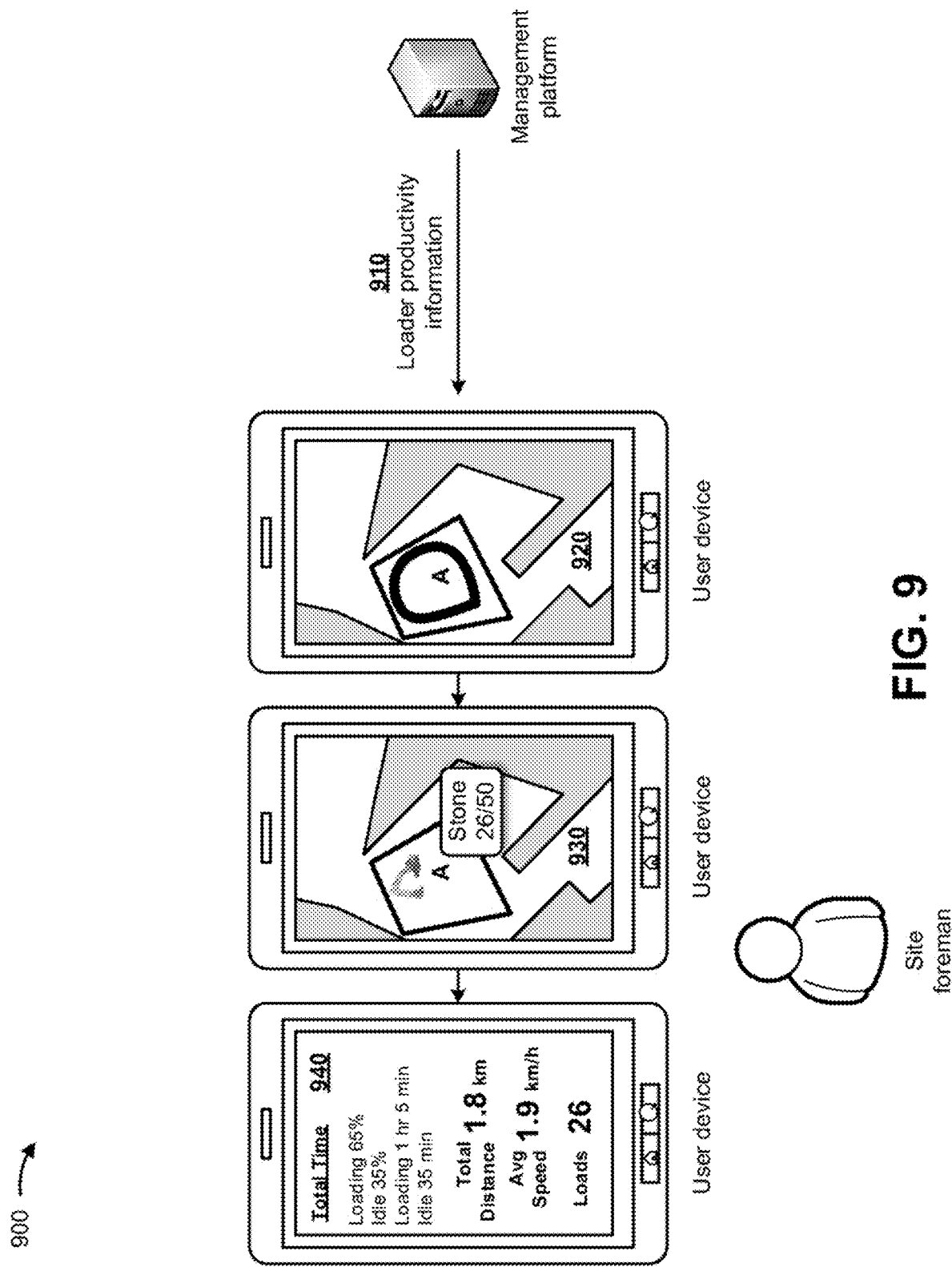

As shown in example implementation 900 of FIG. 9, and by reference number 910, the management platform may provide loader productivity information to the user device associated with the site foreman. In some implementations, the loader productivity information may include information indicating a quantity and/or a percentage of time spent loading by loaders, a quantity and/or percentage of time spent idle by loaders, load counts for loaders, routes traveled by loaders, distances traveled by loaders, average speeds of loaders, and/or the like. In some implementations, the loader may include sensors (e.g., communicating with the management platform and/or the user device) that provide information indicating routes traveled by the loader, quantities of loads provided by the loader, a weight of the loader, a time to load material by the loader, a quantity of material loaded per load, and/or the like. In some implementations, the user device may receive the loader productivity information and may provide the information for display via a variety of user interfaces to the site foreman.

As further shown in FIG. 9, and by reference number 920, the user device may provide, for display to the site foreman, a user interface that provides a route traveled by a particular loader on the job site (e.g., within a load zone). For example, the route may indicate that the particular loader loaded stone at load zone A and traveled around load zone A numerous times.

As further shown in FIG. 9, and by reference number 930, the user device may provide, for display to the site foreman, a user interface that provides, in real time, current load counts at load zone A handled by the loader. For example, the user interface may indicate that twenty-six (26) loads of stone have been loaded at load zone A, and that twenty-four (24) more loads of stone need to be loaded at load zone A.

As further shown in FIG. 9, and by reference number 940, the user device may provide, for display to the site foreman, a user interface that provides loader productivity information for a particular loader on the job site. For example, the user interlace may indicate that particular loader has spent 65% of the time period loading material, 35% of the time period idle, one hour and five minutes loading material, and thirty-five minutes idle. The user interlace may also indicate that the particular loader traveled a total distance of 1.8 kilometers over the time period, traveled at an average speed of 1.9 kilometers per hour (km/h) over the time period, and has completed twenty-six (26) loads of material.

Figure 10:
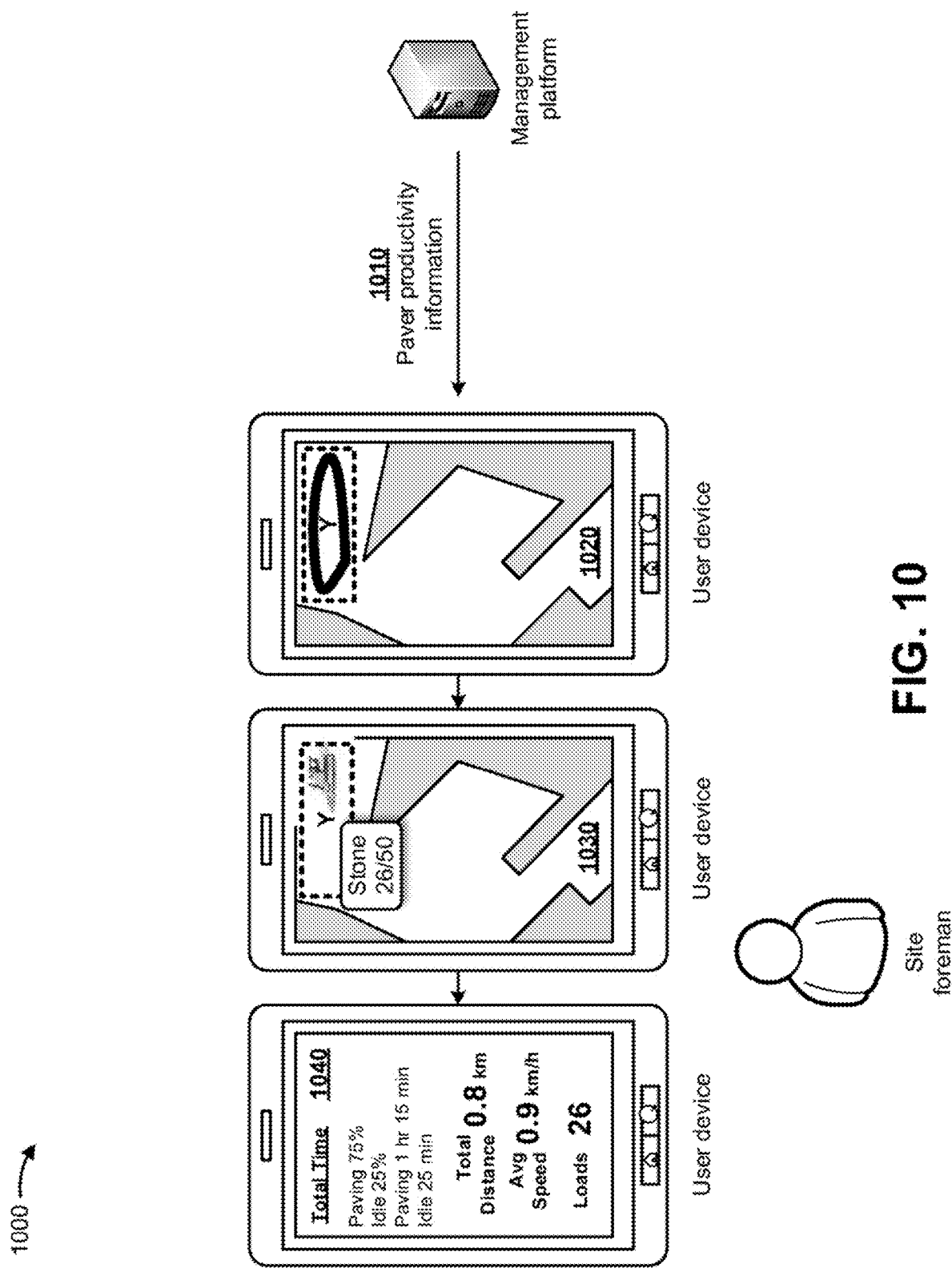

As shown in example implementation 1000 of FIG. 10, and by reference number 1010, the management platform may provide paver productivity information to the user device associated with the site foreman. In some implementations, the paver productivity information may include information indicating a quantity and/or a percentage of time spent paving by pavers, a quantity and/or percentage of time spent idle by pavers, load counts for pavers, routes traveled by pavers, distances traveled by pavers, average speeds of pavers, and/or the like. In some implementations, the paver may include sensors (e.g., communicating with the management platform and/or the user device) that provide information indicating routes traveled by the paver, quantities of loads processed by the paver, a weight of the paver, a time to pave material by the paver, a quantity of material paved per load, and/or the like. In some implementations, the user device may receive the paver productivity information and may provide the information for display via a variety of user interfaces to the site foreman.

As further shown in FIG. 10, and by reference number 1020, the user device may provide, for display to the site foreman, a user interface that provides a route traveled by a particular paver on the job site (e.g., within a dump zone). For example, the route may indicate that the particular paver paved stone at dump zone Y and traveled around dump zone Y numerous times.

As further shown in FIG. 10, and by reference number 1030, the user device may provide, for display to the site foreman, a user interface that provides, in real time, current load counts at dump zone Y handled by the paver. For example, the user interface may indicate that twenty-six (26) loads of stone have been processed (e.g., paved) al dump zone Y, and that twenty-four (24) more loads of stone need to be processed at dump zone Y.

As further shown in FIG. 10, and by reference number 1040, the user device may provide, for display to the site foreman, a user interface that provides paver productivity information for a particular paver on the job site. For example, the user interface may indicate that particular paver has spent 75% of the time period paving material, 25% of the time period idle, one hour and fifteen minutes paving material, and twenty-five minutes idle. The user interface may also indicate that the particular paver traveled a total distance of 0.8 kilometers over the time period, traveled at an average speed of 0.9 kilometers per hour (km/h) over the time period, and has processed twenty-six (26) loads of material.

In some implementations, the management platform may perform an action based on the loud count of the material loaded by the loader and/or processed by the paver. For example, the action performed by management platform may include revising assignments for machines (e.g., loaders, pavers, dump trucks, and/or the like). In such an example, the management platform may provide a revision to a load zone, a dump zone, a material to transport, a quantity of loads, and/or the like, to user devices associated with machines. The revision may include requiring a lesser quantity of loads from loader C (e.g., reduced from 50 to 25 loads if loader operator C is behind in loads of stone).

In some implementations, the action performed by the management platform may include providing, to the user device associated with the site foreman, information identifying load counts of a material. In this way, the site foreman may track productivity of the loaders, the pavers, and/or the dump trucks, and may rate the operators of such machines for future job assignments.

In some implementations, the action performed by the management platform may include providing, to user devices associated with machines, one or more alerts associated with the load count of the material. In this way, operators of the machines may track such information and may determine how much operators will get paid. In some implementations, the management platform may control a loading machine (e.g., a loader, an excavator, a backhoe, and/or the like) that provides material to a dump truck. In such implementations, the management platform may know that a particular dump truck operates most efficiently with particular weight of material, and may instruct the loading machine to fill the dump with the particular weight.

In some implementations, one or more of the loaders, the pavers, the dump trucks, and/or the like may be autonomous vehicles that are controlled by the management platform. In such implementations, the autonomous vehicles may perform one or more the operations, described herein, based on instructions received from the management platform. For example, the management platform may instruct the loader to traverse load zone A and load stone in one or more dump trucks until fifty (50) loads of stone have been loaded by the loader.

As indicated above, FIGS. 1-10 are provided merely as examples. Other examples are possible and may differ front what was described with regard to FIGS. 1-10.

Figure 11:
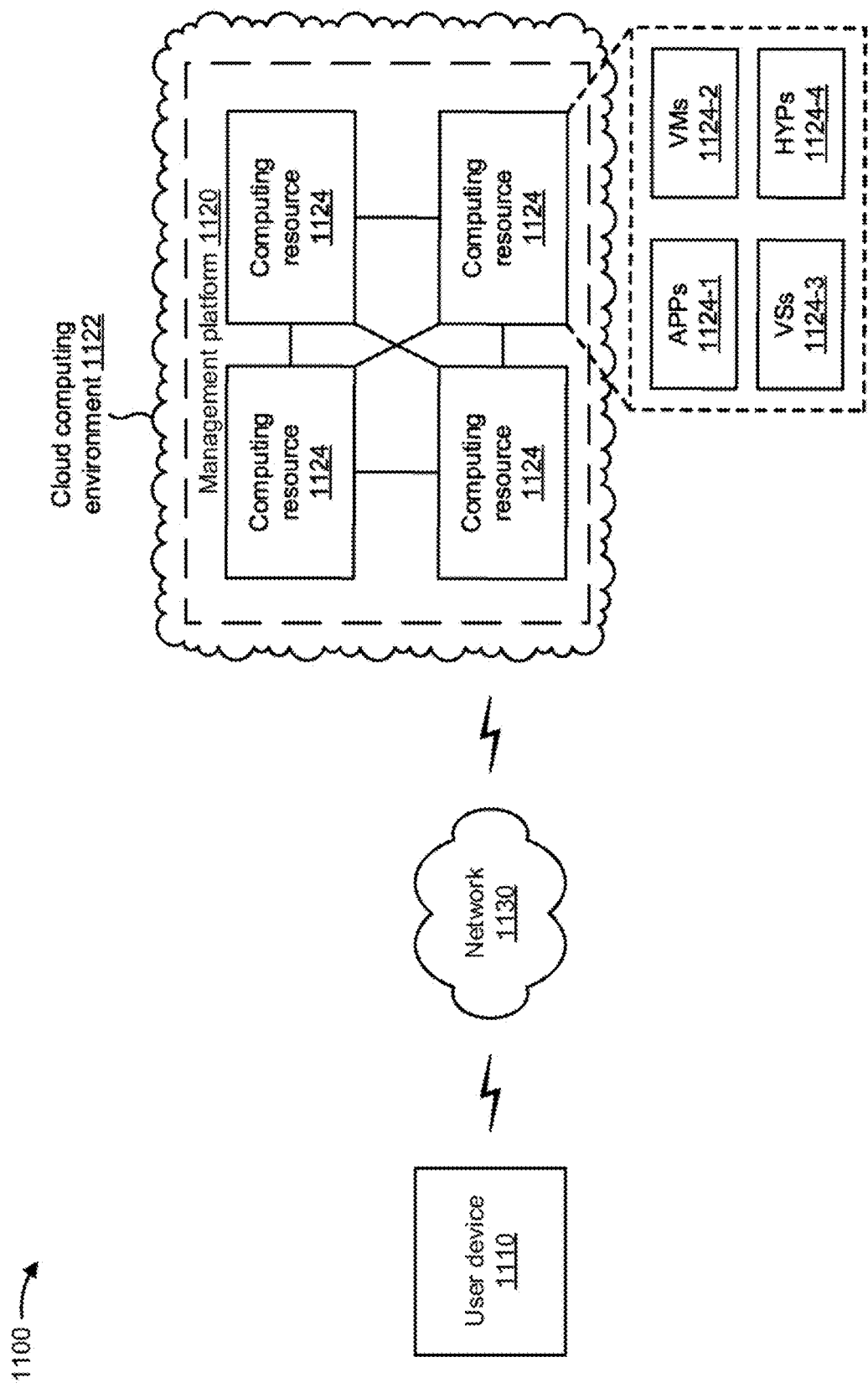
FIG. 11 is a diagram of an example environment in which systems and/or methods, described herein, may be implemented.

FIG. 11 is a diagram of an example environment 1100 in which systems and/or methods, described herein, may be implemented. As shown in FIG. 11, environment 1100 may include a user device 1110, a management platform 1120, and a network 1130. Devices of environment 1100 may interconnect via wired connections, wireless connections, or a combination of wired and wireless connections.

User device 1110 includes one or more devices capable of receiving, generating, storing, processing, and/or providing information, such as information described herein. For example, user device 1110 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a navigational device, a telemetry device, or a similar type of device. In some implementations, user device 1110 may receive information from and/or transmit information to management platform 1120.

Management platform 1120 includes one or more devices that manage material delivery productivity associated with a machine (e.g., associated with user device 1110). In some implementations, management platform 1120 may be designed to be modular such that certain software components may be swapped in or out depending on a particular need. As such, management platform 1120 may be easily and/or quickly reconfigured for different uses. In some implementations, management platform 1120 may receive information from and/or transmit information to one or more user devices 1110.

In some implementations, as shown, management platform 1120 may be hosted in a cloud computing environment 1122. Notably, while implementations described herein describe management platform 1120 as being hosted in a cloud computing environment 1122, in some implementations, management platform 1120 may not be cloud-based (i.e., may be implemented outside of a cloud computing environment) or may be partially cloud-based.

Cloud computing environment 1122 includes an environment that hosts management platform 1120. Cloud computing environment 1122 may provide computation, software, data access, storage, etc. services that do not require end-user knowledge of a physical location and configuration of system(s) and/or device(s) that hosts management platform 1120. As shown, cloud computing environment 1122 may include a group of computing resources 1124 (referred to collectively as "computing resources 1124" and individually as "computing resource 1124").

Computing resource 1124 includes one or more personal computers, workstation computers, server devices, or other types of computation and/or communication devices. In some implementations, computing resource 1124 may host management platform 1120. Cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, and/or the like.

Application 1124-1 includes one or more software applications that may be provided to or accessed by user device 1110. Application 1124-1 may eliminate a need to install and execute the software applications on user device 1110. For example, application 1124-1 may include software associated with management platform 1120 and/or any other software capable of being provided via cloud computing environment 1122. In some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS"). A process virtual machine may execute a single program, and may support a single process. In some implementations, virtual machine 1124-2 may execute on behalf of a user (e.g., a user of user device 1110 or an operator of management platform 1120), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementation, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

Figure 12:
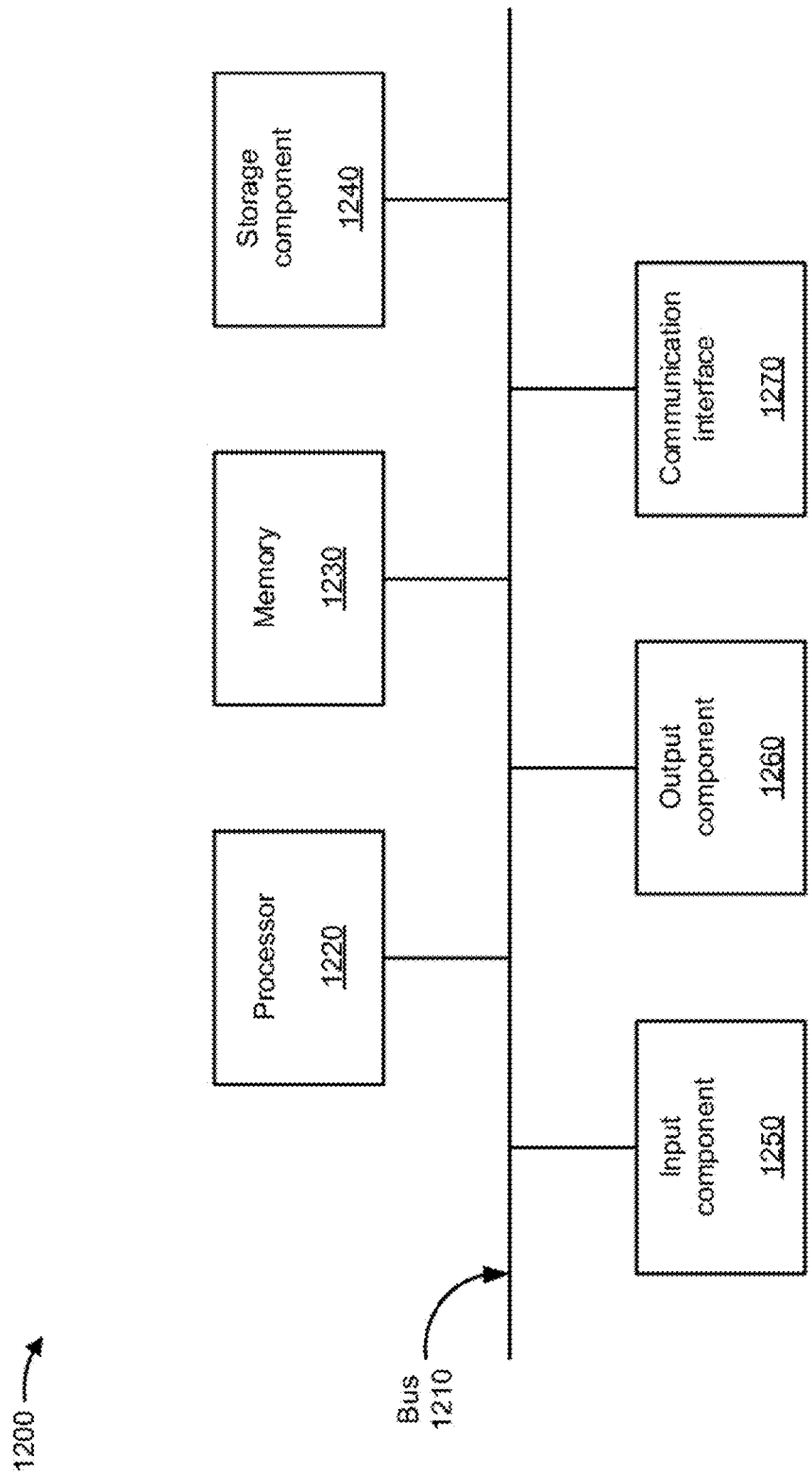
FIG. 12 is a diagram of example components of one or more devices of FIG. 11.

FIG. 12 is a diagram of example components of a device 1200. Device 1200 may correspond to user device 1110, management platform 1120, and/or computing resource 1124. In some implementations, user device 1110, management platform 1120, and/or computing resource 1124 may include one or more devices 1200 and/or one or more components of device 1200. As shown in FIG. 12, device 1200 may include a bus 1210, a processor 1220, a memory 1230, a storage component 1240, an input component 1250, an output component 1260, and a communication interface 1270.

Bus 1210 includes a component that permits communication among the components of device 1200. Processor 1220 is implemented in hardware, firmware, or a combination of hardware and software. Processor 1220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1220 includes one or more processors capable of being programmed to perform a function. Memory 1210 includes a random access memory (RAM), a read only memory (ROM), and/or another type of dynamic or static storage device (e.g., a flash memory, a magnetic memory, and/or an optical memory) that stores information and/or instructions for use by processor 1220.

Storage component 1240 stores information and/or software related to the operation and use of device 1200. For example, storage component 1240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1250 includes a component that permits device 1200 to receive information, such as via user input (e.g., a touch screen display, a keyboard, a keypad, a mouse, a button, a switch, and/or a microphone). Additionally, or alternatively, input component 1250 may include a sensor for sensing information (e.g., a global positioning system (GPS) component, an accelerometer, a gyroscope, and/or an actuator). Output component 1260 includes a component that provides output information from device 1200 (e.g., a display, a speaker, and/or one or more light-emitting diodes LEDs)).

Communication interface 1270 includes a transceiver-like component (e.g., a transceiver and/or a separate receiver and transmitter) that enables device 1200 to communicate with other devices, such as via a wired connection, a wireless connection, or a combination of wired and wireless connections. Communication interface 1270 may permit device 1200 to receive information from another device and/or provide information to another device. For example, communication interface 1270 may include an Ethernet interface, an optical interface, a coaxial interface, an infrared interface, a radio frequency (RF) interface, a universal serial bus (USB) interface, a Wi-Fi interface, a cellular network interface, and/or the like.

Device 1200 may perform one or more processes described herein. Device 1200 may perform these processes based on processor 1220 executing software instructions stored by a non-transitory computer-readable medium, such as memory 1230 and/or storage component 1240. A computer-readable medium is defined herein as a non-transitory memory device. A memory device includes memory space within a single physical storage device or memory space spread across multiple physical storage devices.

Software instructions may be read into memory 1230 and/or storage component 1240 from another computer-readable medium or from another device via communication interface 1270. When executed, software instructions stored in memory 1230 and/or storage component 1240 may cause processor 1220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 12 are provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

Figure 13:
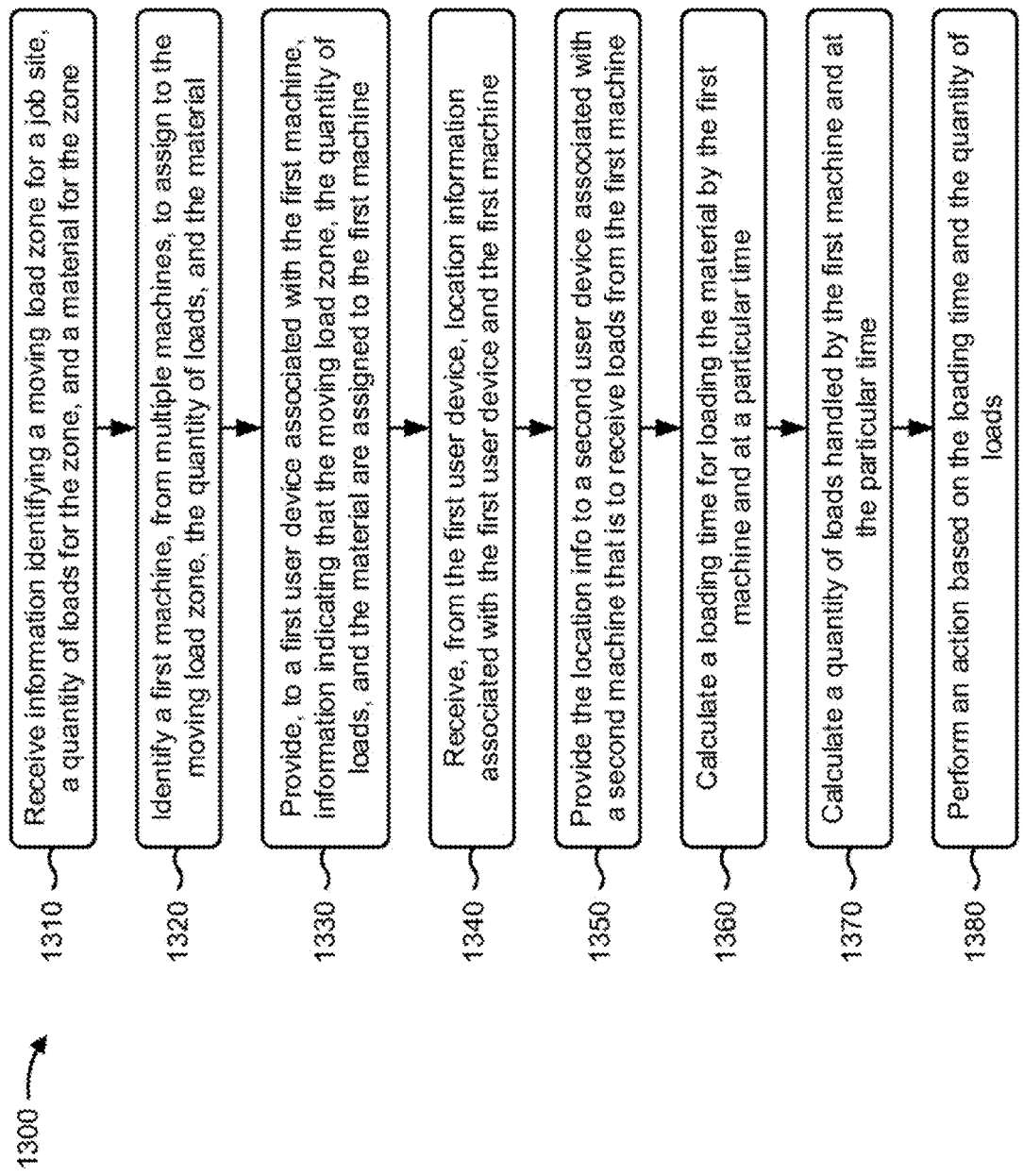

FIG. 13 is a flow chart of an example process 1300 for managing material handling productivity. In some implementations one or more process blocks of FIG. 13 may be performed by a management platform (e.g., management platform 1120). In some implementations, one or more process blocks of FIG. 13 may be performed by another device or a group of devices separate from or including the management platform, such us a user device (e.g., user device 1110).

As shown in FIG. 13, process 1300 may include receiving information identifying a moving load zone for a job site, a quantity of loads for the moving load zone, and a material for the moving load zone (block 1310). For example, the management platform (e.g., using computing resource 1124, processor 1220, communication interface 1270, and/or the like) may receive information identifying a moving load zone for a job site, a quantity of loads for the moving load zone, and a material for the moving load zone, as described above in connection with FIGS. 1-11.

As further shown in FIG. 13, process 1300 may include identifying a first machine, from multiple machines, to assign to the moving load zone, the quantity of loads, and the material (block 1320). For example, the management platform (e.g., using computing resource 1124, processor 1220, storage component 1240, and/or the like) may identify a first machine, from multiple machines, to assign to the moving load zone, the quantity of loads, and the material, as described above in connection with FIGS. 1-11.

As further shown in FIG. 13, process 1300 may include providing, to a first user device associated with the first machine, information indicating that the moving load zone, the quantity of loads, and the material are assigned to the first machine (block 1330). For example, the management platform (e.g., using computing resource 1124, processor 1220, communication interface 1270, and/or the like) may provide, to a first user device associated with the first machine, information indicating that the moving load zone, the quantity of loads, and the material are assigned to the first machine, as described above in connection with FIGS. 1-11.

As further shown in FIG. 13, process 1300 may include receiving, from the first user device, location information associated with the first user device and the first machine (block 1340). For example, the management platform (e.g., using computing resource 1124, processor 1220, communication interface 1270, and/or the like) may receive, from the first user device, location information associated with the first user device and the first machine, as described above in connection with FIGS. 1-11.

As further shown in FIG. 13, process 1300 may include providing the location information to a second user device associated with a second machine that is to receive loads from the first machine (block 1350). For example, the management platform (e.g., using computing resource 1124, processor 1220, communication interlace 1270, and/or the like) may provide the location information to a second user device associated with a second machine that is to receive loads from the first machine, as described above in connection with FIGS. 1-11.

As further shown in FIG. 13, process 1300 may include calculating a loading time for loading the material by the first machine and at a particular time (block 1360). For example, the management platform (e.g., using computing resource 1124, processor 1220, memory 1230, and/or the like) may calculate a loading time for loading the material by the first machine and at a particular time, as described above in connection with FIGS. 1-11.

As further shown in FIG. 13, process 1300 may include calculating a quantity of loads handled by the first machine and at the particular time (block 1370). For example, the management platform (e.g., using computing resource 1124, processor 1220, storage component 1240, and/or the like) may calculate a quantity of loads handled by the first machine and at the particular time, as described above in connection with FIGS. 1-11.

As further shown in FIG. 13, process 1300 may include performing an action based on the loading time and the quantity of loads (block 1380). For example, the management platform (e.g., using computing resource 1124, processor 1220, memory 1230, communication interface 1270, and/or the like) may perform an action based on the loading time and the quantity of loads, as described above in connection with FIGS. 1-11.

Process 1300 may include additional implementations, such as any single implementation or any combination of implementations described below and/or described with regard to any other process described herein.

In some implementations, the information identifying the moving load zone for the job site may be provided via geographical boundaries that are input to a user interface displaying a visual rendering of the job site. In some implementations, the information identifying the moving load zone for the job site may be determined based on a location of the first machine on the job site. In some implementations, the management platform may provide, to a third user device, information identifying the loading time and the quantity of loads.

In some implementations, the management platform may determine a quantity of time spent loading by the first machine, may determine a quantity of time spent on the job site by the first machine, and may calculate the loading time based on the quantity of time spent loading by the first machine and the quantity of time spent on the job site by the first machine. In some implementations, the management platform may receive, from sensors associated win the first machine, information indicating that the first machine is loading, and may calculate the quantity of loads based on the information indicating that the first machine is loading. In some implementations, the first machine may include an excavator, a loader, or a backhoe.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
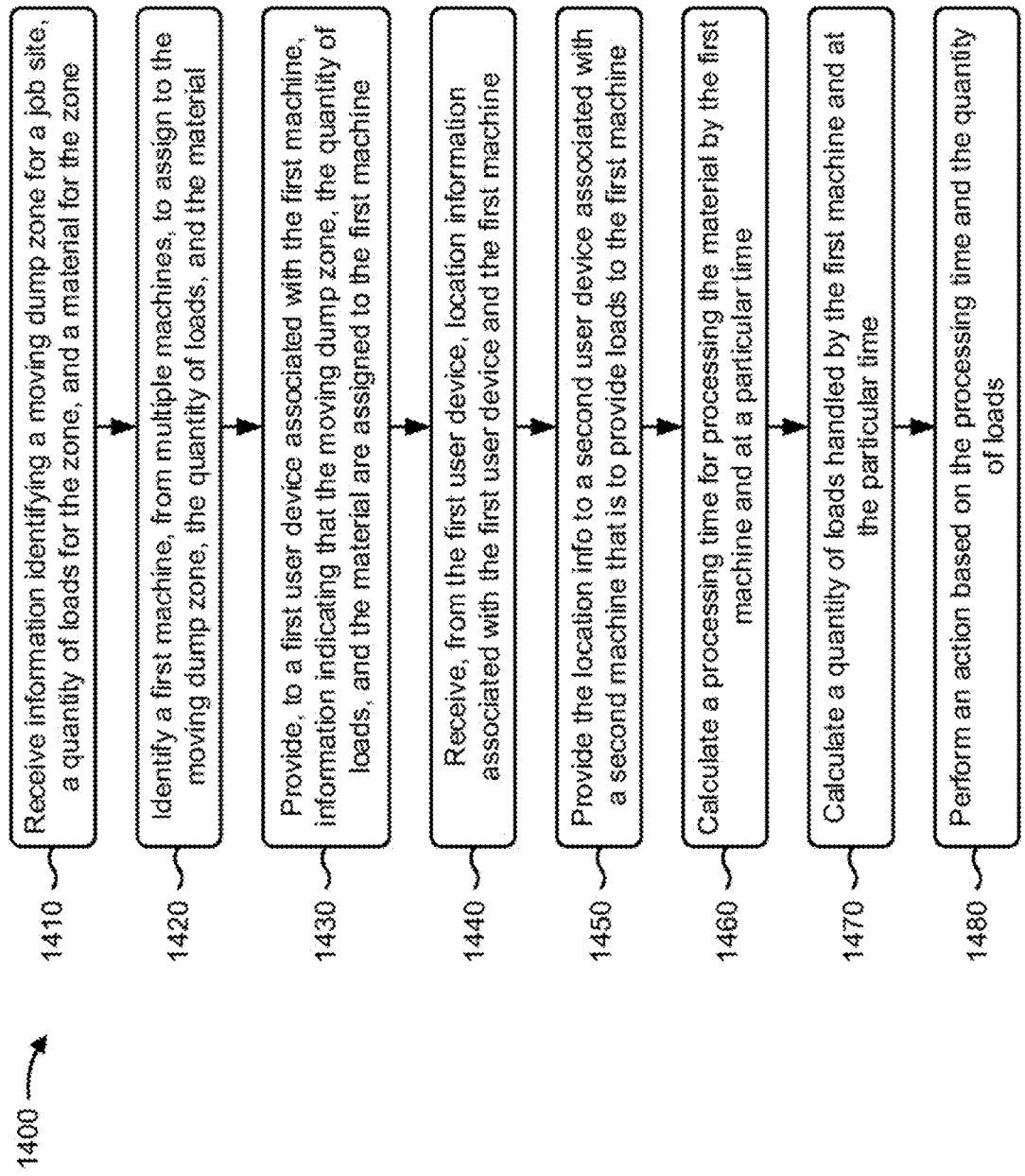

FIG. 14 is a flow chart of another example process 1400 for managing material handling productivity. In some implementations, one or more process blocks of FIG. 14 may be performed by a management platform (e.g., management platform 1120). In some implementations, one or more process blocks of FIG. 14 may be performed by another device or a group of devices separate from or including the management platform, such as a user device (e.g., user device 1110).

As shown in FIG. 14, process 1400 may include receiving information identifying a moving dump zone for a job site, a quantity of loads for the moving dump zone, and a material for the moving dump zone (block 1410). For example, the management platform (e.g., using computing resource 1124, processor 1220, communication interface 1270, and/or the like) may receive information identifying a moving dump zone for a job site, a quantity of loads for the moving dump zone, and a material for the moving dump zone, as described above in connection with FIGS. 1-11.

As further shown in FIG. 14, process 1400 may include identifying a first machine, from multiple machines, to assign to the moving dump zone, the quantity of loads, and the material (block 1420). For example, the management platform (e.g., using computing resource 1124, processor 1220, storage component 1240, and/or the like) may identify a first machine, from multiple machines, to assign to the moving dump zone, the quantity of loads, and the material, as described above in connection with FIGS. 1-11.

As further shown in FIG. 14, process 1400 may include providing, to a first user device associated with the first machine, information indicating that the moving dump zone, the quantity of loads, and the material are assigned to the first machine (block 1430). For example, the management platform (e.g., using computing resource 1124, processor 1220, communication interlace 1270, and/or the like) may provide, to a first user device associated with the first machine, information indicating that the moving dump zone, the quantity of loads, and the material are assigned to the first machine, as described above in connection with FIGS. 1-11.

As further shown in FIG. 14, process 1400 may include receiving, from the first user device, location information associated with the first user device and the first machine (block 1440). For example, the management platform (e.g., using computing resource 1124, processor 1220, communication interface 1270, and/or the like) may receive, from the first user device, location information associated with the first user device and the first machine, as described above in connection with FIGS. 1-11.

As further shown in FIG. 14, process 1400 may include providing the location information to a second user device associated with a second machine that is to provide loads to the first machine (block 1450). For example, the management platform (e.g., using computing resource 1124, processor 1220, communication interface 1270, and/or the like) may provide the location information to a second user device associated with a second machine that is to provide loads to the first machine, as described above in connection with FIGS. 1-11.

As further shown in FIG. 14, process 1400 may include calculating a processing time for processing the material by the first machine and at a particular time (block 1460). For example, the management platform (e.g., using computing resource 1124, processor 1220, memory 1230, and/or the like) may calculate a processing time for processing the material by the first machine and at a particular time, as described above in connection with FIGS. 1-11.

As further shown in FIG. 14, process 1400 may include calculating a quantity of loads handled by the first machine and at the particular time (block 1470). For example, the management platform (e.g., using computing resource 1124, processor 1220, storage component 1240, and/or the like) may calculate a quantity of loads handled by the first machine and at the particular time, as described above in connection with FIGS. 1-11.

As further shown in FIG. 14, process 1400 may include performing an action based on the processing time and the quantity of loads (block 1480). For example, the management platform (e.g., using computing resource 1124, processor 1220, memory 1230, communication interface 1270, and/or the like) may perform an action based on the processing time and the quantity of loads, as described above in connection with FIGS. 1-11.

Process 1400 may include additional implementations, such as any single implementation or any combination of implementations described below and/or described with regard to any other process described herein.

In some implementations, the action may include providing, to the first user device or a third user device, information identifying the processing time and the quantity of loads. In some implementations, the information identifying the moving dump zone for the job site may be determined based on a location of the first machine on the job site. In some implementations, the management platform may determine a quantity of time spent processing the material by the first machine, may determine a quantity of time spent on the job site by toe first machine, and may calculate the processing time based on the quantity of time spent processing the material by the first machine and the quantity of time spent on the job site by the first machine.

In some implementations, the management platform may receive, from sensors associated with the first machine, information indicating that the first machine is processing the material, and may calculate the quantity of loads based on the information indicating that the first machine is processing the material. In some implementations, the first machine may include a paver, a bulldozer, or a steamroller. In some implementations, the management platform may monitor the job site based on statuses of the first machine, may generate one or more alerts based on monitoring the job site, and may provide the one or more alerts to the first user device.

Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a flow chart of still another example process 1500 for managing material handling productivity. In some implementations, one or more process blocks of FIG. 15 may be performed by a management platform (e.g., management platform 1120). In some implementations, one or more process blocks of FIG. 15 may be performed by another device or a group of devices separate from or including the management platform, such as a user device (e.g., user device 1110).

As shown in FIG. 15, process 1500 may include receiving information identifying a moving zone for a job site, a quantity of loads for the moving zone, and a material for the moving zone (block 1510). For example, the management platform (e.g., using computing resource 1124, processor 1220, communication interface 1270, and/or the like) may receive information identifying a moving zone for a job site, a quantify of loads for the moving zone, and a material for the moving zone, as described above in connection with FIGS. 1-11.

As further shown in FIG. 15, process 1500 may include identifying a first machine, from multiple machines, to assign to the moving zone, the quantity of loads, and the material (block 1520). For example, the management platform (e.g., using computing resource 1124, processor 1220, storage component 1240, and/or the like) may identify a first machine, from multiple machines, to assign to the moving zone, the quantity of loads, and the material, as described above in connection with FIGS. 1-11.

As further shown in FIG. 15, process 1500 may include providing, to a first user device associated with the first machine, information indicating that the moving zone, the quantity of loads, and the material are assigned to the first machine (block 1530). For example, the management platform (e.g., using computing resource 1124, processor 1220, communication interface 1270, and/or the like) may provide, to a first user device associated with the first machine, information indicating that the moving zone, the quantity of loads, and the material are assigned to the first machine, as described above in connection with FIGS. 1-11.

As further shown in FIG. 15, process 1500 may include receiving, from the first user device, location information associated with the first user device and the first machine (block 1540). For example, the management platform (e.g., using computing resource 1124, processor 1220, communication interface 1270, and/or the like) may receive, from the first user device, location information associated with the first user device and the first machine, as described above in connection with FIGS. 1-11.

As further shown in FIG. 15, process 1500 may include providing the location information to a second user device, associated with a second machine, to enable the second machine to travel to the first machine (block 1550). For example, the management platform (e.g., using computing resource 1124, processor 1220, communication interface 1270, and/or the like) may provide the location information in a second user device, associated with a second machine, to enable the second machine to travel to the first machine, as described above in connection with FIGS. 1-11.

Process 1500 may include additional implementations, such as any single implementation or any combination of implementations described below and/or described with regard to any other process described herein.

In some implementations, the management platform may provide navigation information to the second user device, wherein the navigation information may provide navigation instructions from a location of the second machine to a location of the first machine. In some implementations, the management platform may calculate a processing time for processing the material by the first machine and at a particular time, may calculate a quantity of loads handled by the first machine and at the particular time, and may perform an action based on the processing time and the quantity of loads.

In some implementations, the first machine may include one of an excavator, a loader, a backhoe, a paver, a bulldozer, or a steamroller. In some implementations, the information identifying the moving zone for the job site may be determined based on a location of the first machine on the job site. In some implementations, the management platform may monitor statuses of the first machine, may generate one or more alerts based on monitoring the statuses of the first machine, and may provide the one or more alerts to the first user device.

Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

INDUSTRIAL APPLICABILITY

Management platform 1120 may be used to manage material delivery productivity. In some implementations, management platform 1120 may receive information identifying a moving zone for a job site, a quantity of loads for the moving zone, and a material for the moving zone, and may identify a first machine, from multiple machines, to assign to the moving zone, the quantity of loads, and the material. Management platform 1120 may provide, to a first user device 1110 associated with the first machine, information indicating that the moving zone, the quantity of loads, and the material are assigned to the first machine. Management platform 1120 may receive, from the first user device 1110, location information associated with the first user device 1110 and the first machine, and may provide the location information to a second user device 1110, associated with a second machine, to enable the second machine to travel to the first machine.

In this way, several different stages of the process for managing material handling productivity are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, current systems require utilizing expensive telemetry hardware (e.g., embedded or retrofit in a machine) to track materials. Finally, automating the process for managing material handling productivity conserves computing resources (e.g., processing resources, memory resources, and/or the like) that would otherwise be wasted in attempting to manage material handling productivity.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A device comprising:
   one or more memory devices; and
   one or more processors, operatively coupled to the one or more memory devices, to:
   receive information identifying a job site, a quantity of loads for a moving load zone, and a material for the moving load zone;
   identify a machine from multiple machines;
   provide, to a first user device associated with the machine, information indicating that the quantity of loads for the moving load zone and the material are assigned to the machine;
   receive, from the first user device, location information associated with the first user device and the machine;
   assign, based on the location information, the moving load zone to a location of the machine on the job site;
   provide, as the moving load zone, a shape with a center representing the location of the machine;
   receive, via a user interface of a second user device, information identifying an edit to change the shape to a different shape that provides a geographical boundary or a geo-fence that represents the moving load zone;
   calculate a loading time for loading the material by the machine and at a particular time;
   calculate a quantity of loads handled by the machine and at the particular time; and
   perform an action based on the loading time and the quantity of loads handled by the machine.

2. The device of claim 1, wherein the information identifying the job site is provided via a user interface displaying a visual rendering of the job site.

3. The device of claim 1, wherein, when performing the action, the one or more processors are to:
   provide, to a third user device, information identifying the loading time and the quantity of loads handled by the machine.

4. The device of claim 1, wherein the one or more processors, when calculating the loading time, are to:
   determine a quantity of time spent loading by the machine;
   determine a quantity of time spent on the job site by the machine; and
   calculate the loading time based on the quantity of time spent loading by the machine and the quantity of time spent on the job site by the machine.

5. The device of claim 1, wherein the one or more processors, when calculating the quantity of loads handled by the machine, are to:
   receive, from sensors associated with the machine, information indicating that the machine is loading; and
   calculate the quantity of loads handled by the machine based on the information indicating that the machine is loading.

6. The device of claim 1, wherein the machine includes an excavator, a loader, or a backhoe.

7. The device of claim 1, wherein the one or more processors are to:
   track, via a third user interface associated with a processing machine that processes a load of the quantity of loads handled by the machine, a location of the processing machine; and
   assign a moving dump zone to the location of the processing machine.

8. A non-transitory computer-readable medium storing instructions, the instructions comprising:
   one or more instructions that, when executed by one or more processors of a device, cause the one or more processors to:
   receive information identifying a job site, a quantity of loads for a moving load zone, and a material for the moving load zone;
   identify a machine from multiple machines;
   provide, to a first user device associated with the machine, information indicating that the quantity of loads for the moving load zone and the material are assigned to the machine;
   receive, from the first user device location information associated with the first user device and the machine;
   assign, based on the location information, a moving load zone to a location of the machine on the job site;
   provide, as the moving load zone, a shape with a center representing the location of the machine;
   receive, via a user interface of a second user device, information identifying an edit to change the shape to a different shape that provides a geographical boundary or a geo-fence that represents the moving load zone;
   calculate a processing time for processing the material, for the moving dump zone, by the machine and at a particular time;
   calculate a quantity of loads handled by the machine and at the particular time; and perform an action based on the processing time and the quantity of loads handled by the machine.

9. The non-transitory computer-readable medium of claim 8, wherein the action includes:
providing, to the first user device or the user device, information identifying the processing time.

10. The non-transitory computer-readable medium of claim 8, wherein the one or more instructions, that cause the one or more processors to calculate the processing time, cause the one or more processors to:
determine a quantity of time spent processing the material by the machine;
determine a quantity of time spent on the job site by the machine; and
calculate the processing time based on the quantity of time spent processing the material by the machine and the quantity of time spent on the job site by the machine.

11. The non-transitory computer-readable medium of claim 8, wherein the one or more instructions, that cause the one or more processors to calculate the quantity of loads handled by the machine, cause the one or more processors to:
receive, from sensors associated with the machine, information indicating that the machine is processing the material; and
calculate the quantity of loads handled by the machine based on the information indicating that the machine is processing the material.

12. The non-transitory computer-readable medium of claim 8, wherein the machine is a paver, a bulldozer, or a steamroller.

13. The non-transitory computer-readable medium of claim 8, further comprising:
one or more instructions that, when executed by the one or more processors, cause the one or more processors to:
monitor the job site based on statuses of the machine;
generate one or more alerts based on monitoring the job site; and
provide the one or more alerts to the first user device.

14. The non-transitory computer-readable medium of claim 8, wherein the one or more instructions further cause the one or more processors to:
track a location of a processing machine that processes a load of the quantity of loads handled by the machine; and
assign a moving dump zone to the location of the processing machine.

15. A method comprising:
receiving, by a device, information identifying a job site, a quantity of loads for a moving load zone, and a material for the moving load zone;
identifying, by the device, a machine from multiple machines;
providing, by the device and to a first user device associated with the machine, information indicating that the quantity of loads for the moving load zone and the material are assigned to the machine;
receiving, by the device and from the first user device, location information associated with the first user device and the machine;
assigning, based on the location information, a moving load zone to a location of the machine on the job site;
providing, as the moving load zone, a shape with a center representing the location of the machine;
receiving, via a user interface of a second user device, information identifying an edit to change the shape to a different shape that provides a geographical boundary or a geo-fence that represents the moving load zone;
calculating, by the device, a loading time for loading the material by the machine and at a particular time;
calculating, by the device, a quantity of loads handled by the machine and at the particular time; and
performing, by the device, an action based on the loading time and the quantity of loads handled by the machine.

16. The method of claim 15, further comprising:
providing navigation information to a third user device associated with a different machine,
the navigation information providing navigation instructions from a location of the different machine to the location of the machine.

17. The method of claim 15, wherein the machine is one of:
an excavator,
a loader,
a backhoe,
a paver,
a bulldozer, or
a steamroller.

18. The method of claim 15, further comprising:
monitoring statuses of the machine;
generating one or more alerts based on monitoring the statuses of the machine; and
providing the one or more alerts to the first user device.

19. The method of claim 15, further comprising:
tracking a location of a processing machine that processes a load; and
assigning a moving dump zone to the location of the processing machine.

20. The method of claim 15, further comprising:
providing the location information to a third user device, associated with a different machine, to enable the different machine to travel to the machine.

* * * * *